US012166798B2

(12) United States Patent
Li et al.

(10) Patent No.: US 12,166,798 B2
(45) Date of Patent: Dec. 10, 2024

(54) SYSTEMS AND METHODS FOR APPLICATION SECURITY UTILIZING CENTRALIZED SECURITY MANAGEMENT

(71) Applicant: Verizon Patent and Licensing Inc., Basking Ridge, NJ (US)

(72) Inventors: Minbao Li, Lewisville, TX (US); Eugene A. Oliva, New Providence, NJ (US); Michael L. Hoarle, Branchburg, NJ (US); David Taft, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 354 days.

(21) Appl. No.: 17/385,397

(22) Filed: Jul. 26, 2021

(65) Prior Publication Data

US 2023/0028642 A1 Jan. 26, 2023

(51) Int. Cl.
*H04L 29/06* (2006.01)
*H04L 9/40* (2022.01)

(52) U.S. Cl.
CPC .......... *H04L 63/20* (2013.01); *H04L 63/0272* (2013.01); *H04L 63/029* (2013.01); *H04L 63/0435* (2013.01); *H04L 63/0823* (2013.01); *H04L 63/0876* (2013.01); *H04L 63/166* (2013.01); *H04L 63/168* (2013.01)

(58) Field of Classification Search
CPC ... H04L 63/20; H04L 63/0272; H04L 63/029; H04L 63/0435; H04L 63/0823; H04L 63/0876; H04L 63/166; H04L 63/168; H04L 63/0428
See application file for complete search history.

(56) References Cited

U.S. PATENT DOCUMENTS

| 5,602,918 A * | 2/1997 | Chen ..................... H04L 9/3273 |
| | | 713/153 |
| 7,370,194 B2 * | 5/2008 | Morais .................. H04L 67/131 |
| | | 713/153 |
| 2004/0249974 A1 * | 12/2004 | Alkhatib ............. H04L 61/2503 |
| | | 709/245 |

(Continued)

OTHER PUBLICATIONS

Cirani, Simone, Gianluigi Ferrari, and Luca Veltri. "Enforcing security mechanisms in the IP-based internet of things: An algorithmic overview." Algorithms 6.2 (2013): 197-226. (Year: 2013).*

*Primary Examiner* — Shawnchoy Rahman

(57) ABSTRACT

One or more computing devices, systems, and/or methods for managing security associated with applications are provided. In an example, a central security gateway may determine first security policy information associated with a first application. The central security gateway may establish a first encrypted connection with a first device of the first application. The central security gateway may manage, based upon the first security policy information and using the first encrypted connection, security associated with the first application. The central security gateway may determine second security policy information associated with a second application. The central security gateway may establish a second encrypted connection with a second device of the second application. The central security gateway may manage, based upon the second security policy information and using the second encrypted connection, security associated with the second application.

20 Claims, 13 Drawing Sheets

(56) References Cited

U.S. PATENT DOCUMENTS

| | | | |
|---|---|---|---|
| 2008/0201769 A1* | 8/2008 | Finn | G06Q 20/4014 |
| | | | 707/999.01 |
| 2008/0267395 A1* | 10/2008 | Deishi | H04L 63/065 |
| | | | 380/44 |
| 2014/0282834 A1* | 9/2014 | Guinan | H04L 63/06 |
| | | | 726/1 |
| 2019/0364072 A1* | 11/2019 | Purusothaman | H04L 63/0263 |

* cited by examiner

Application Detail

Application Information

| Field | Value |
|---|---|
| Code Name: | terra3 |
| Display Name: | Terrasmith Three Video Platform |
| Application Category: | |
| Application Type: | External web application |
| Login Method: | Login through application -- HTTP Basic Authentication |
| Server Root: | terrasmiththree.software.net |
| Home Page URL: | https://terrasmiththree.software.net/terra3/ |
| Application Description: | |

[ Application Information | Application Roles | Protected Resources ]

Submit  Close — 402

Server detail

Server ID: 5

Server Host Name: terrasmiththree.software.net

Routing Path: /

Load Balancing Type: FAILOVER

SSL Certificate File: [Choose File] No file chosen

SSL Private Key File: [Choose File] No file chosen

Server Information | Server Instances

[Submit Change] [Close] — 452

SYSTEMS AND METHODS FOR APPLICATION SECURITY UTILIZING CENTRALIZED SECURITY MANAGEMENT

BACKGROUND

Various applications may provide services. The applications may be required to meet security requirements, such as by controlling access to protected resources, performing encrypted communication with clients, managing certificates, etc. However, an application may have to integrate with multiple infrastructure components (e.g., security infrastructure components) to meet such security requirements, which may be a difficult and/or complex task.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 4A is a diagram illustrating an example scenario in which a first interface is displayed via a graphical user interface of a device in accordance with an embodiment.

FIG. 4B is a diagram illustrating an example scenario in which a second interface is displayed via a graphical user interface of a device in accordance with an embodiment.

DETAILED DESCRIPTION OF EXAMPLE EMBODIMENTS

Figure 1:
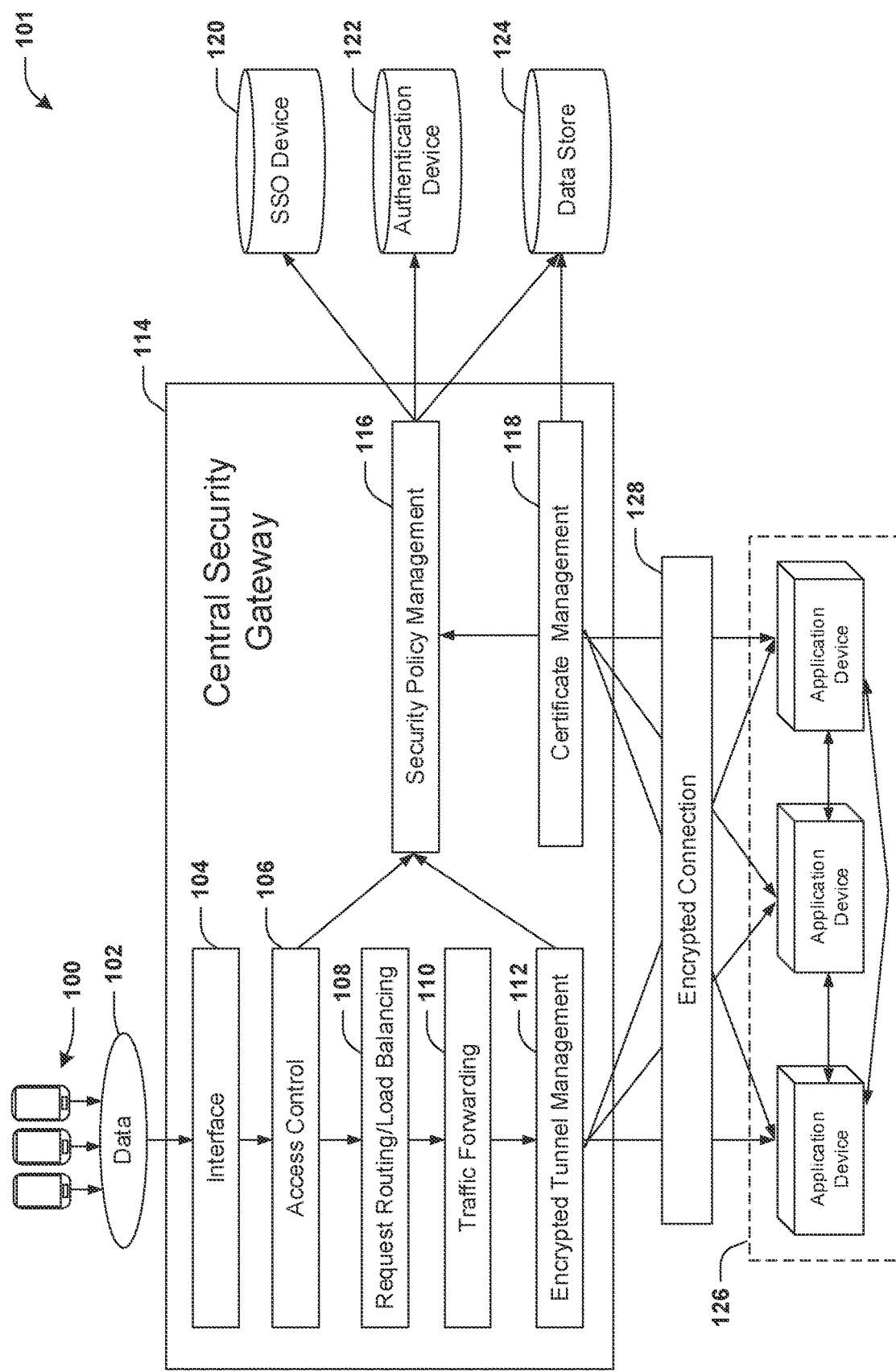
FIG. 1 is a diagram illustrating an example system comprising a central security gateway in accordance with an embodiment.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for managing security associated with applications using a central security gateway are provided. For example, applications may be required to meet security requirements, such as by at least one of controlling access to protected resources, performing encrypted communication with client devices, managing certificates, etc. However, an application may have to integrate with multiple components (e.g., multiple security infrastructure components) to meet such security requirements, which may be a difficult and/or complex task. For example, the application may have to integrate with a first component for registering a domain for the application, a second component for managing certificates for the application, a third component for managing user login and/or single sign-on (SSO) functionality, a fourth component for load balancing, etc.

Accordingly, as provided herein, a central security gateway may establish one or more encrypted connections with one or more application devices of an application. The central security gateway may determine security policy information associated with the application. A trust relationship between the central security gateway and the one or more application devices of the application may be established (such as a result of establishing the one or more encrypted connections and/or having the one or more application devices and/or the central security gateway authenticate and/or authorize the one or more encrypted connections). Accordingly, the central security gateway may be trusted, by the one or more application devices, to perform one or more services, such as security-related services, for the application. Thus, the central security gateway may manage security and/or perform the one or more services for the application (using the one or more encrypted connections, for example). Accordingly, the application may not be required to separately integrate with separate components for managing security and/or performing the one or more services, thereby reducing a complexity of security management for the application.

Alternatively and/or additionally, as provided herein, the central security gateway may handle SSO functionality for multiple applications and/or multiple domains. For example, using the central security gateway and/or one or more of the techniques provided herein, a client may be automatically provided with access to resources of a first application and/or a first domain based upon the client having a valid session with a second application and/or a second domain. Using the central security gateway and/or one or more of the techniques provided herein, the client may be provided with access to the resources of the first application and/or the first domain without depending upon Sign On Federation protocols (not supported by many applications) and/or without requiring the first application to make mandatory changes.

FIG. 1 illustrates an example of a system 101 comprising a central security gateway 114. The central security gateway 114 may receive data 102 (e.g., at least one of transmissions of data by client devices, public data, private data, public traffic, private traffic etc.). In an example, the data 102 may comprise data from client devices of a plurality of client devices 100. Throughout the present disclosure, "client device" may refer to a client device of the plurality of client devices 100. For example, the central security gateway 114 may be communicatively coupled to a client device (e.g., a phone, a laptop, a computer, a wearable device, a smart device, a television, any other type of computing device, Internet-of-Things (IoT) device, hardware, etc.) of the plurality of client devices 100 via one or more types of communication media, such as at least one of communication media over a local area network (e.g., a wireless local area network and/or wired local area network, such as utilizing at least one of Ethernet, WiFi, or other technology), communication media utilizing one or more cellular network technologies (e.g., second-generation cellular technology (2G), third-generation cellular technology (3G), fourth-generation cellular technology (4G), fifth-generation cellular technology (5G) and/or one or more future generation cellular technologies and/or other types of wireless communication media), communication media over a wide area network, cable, optical fiber, radio, etc.

In some examples, the central security gateway 114 may perform functions for applications (e.g., at least one of web applications, network elements, mobile applications, etc.). For example, the functions may comprise at least one of managing communication (e.g., Transport Layer Security (TLS) communication, Secure Sockets Layer (SSL) communication, and/or Hypertext Transfer Protocol Secure (HTTPS) communication) with client devices for an application, performing load balancing for an application (such as to meet a high availability requirement of the application), requesting a domain name for an application, registering one or more Internet Protocol (IP) addresses for an application (e.g., registering one or more IP addresses of an application with a Domain Name System (DNS) device, such as a DNS server), managing issuance and/or renewal of one or more public key certificates for an application, controlling access to one or more resources of an application (e.g., managing login, such as SSO), performing a security audit of an application, performing security monitoring of an application, open firewalls for an application, exposing service ports of an application to clients, etc.

In some examples, the central security gateway 114 may comprise an interface module 104 (e.g., a TLS interface module), an access control module 106, a request routing and/or load balancing module 108, a traffic forwarding module 110, an encrypted tunnel management module 112, a user and security policy management module 116, and/or a certificate management module 118 (e.g., a certificate authority management module and/or a certificate configuration management module). In some examples, the central security gateway 114 may be communicatively coupled to one or more SSO devices 120 (e.g., one or more SSO servers), one or more authentication devices 122 (e.g., one or more lightweight directory access protocol (LDAP) devices, such as one or more LDAP servers), one or more data stores 124 (e.g., one or more devices, such as servers, that store one or more databases). In an example, the central security gateway 114 may communicate with the one or more SSO devices 120, the one or more authentication devices 122 and/or the one or more data stores 124 to perform one or more services for one or more applications.

In some examples, the central security gateway 114 may be communicatively coupled to a plurality of sets of application devices associated with a plurality of applications (e.g., an application of the plurality of applications may correspond to at least one of a web application, a network element, a mobile application, etc.). In an example, the plurality of sets of application devices may comprise at least one of a first set of application devices 126 of a first application, a second set of application devices of a second application (not shown), a third set of application devices of a third application (not shown), etc. The first set of application devices 126 may comprise one or more application devices (e.g., one or more application servers) that host the first application. In an example, the first set of application devices 126 may be configured to provide one or more services (e.g., at least one of a directory service, a scheduling service, a messaging service, an accounting service, a billing service, an invoice service, a content service, a social media service, etc.) of the first application. For example, the first application and/or the first set of application devices 126 may be deployed across one or more networks, one or more platforms, one or more containers, one or more virtual machines and/or one or more bare metal machines.

In some examples, the central security gateway 114 may be communicatively coupled to the first set of application devices 126 via one or more encrypted connections 128 (e.g., the central security gateway 114 may communicate with the first set of application devices 126 via the one or more encrypted connections 128). In some examples, the one or more encrypted connections 128 may comprise a first encrypted connection between the central security gateway 114 and a first application device of the first set of application devices 128. In an example, the first encrypted connection may be established by the central security gateway 114 and/or the first application device (e.g., the first encrypted connection may be established using the encrypted tunnel management module 112). In some examples, the one or more encrypted connections 128 may be authenticated and/or authorized by the first set of application devices 128 and/or the central security gateway 114 (e.g., the first encrypted connection may be authenticated and/or authorized by the first application device). A trust relationship between the central security gateway 114 and the first set of application devices 128 of the first application may be established (such as a result of establishing the one or more encrypted connections 128 and/or having the first set of application devices 128 and/or the central security gateway 114 authenticate and/or authorize the one or more encrypted connections 128). Accordingly, the central security gateway 114 may be trusted, by the first set of application devices 128, to perform one or more services, such as security-related services, for the first application. Alternatively and/or additionally, encrypted connections may be established between the central security gateway 114 and application devices of other applications of the plurality of applications (e.g., the central security gateway 114 may be trusted, by the other applications, to perform one or more services, such as security-related services, for the other applications).

Figure 2:
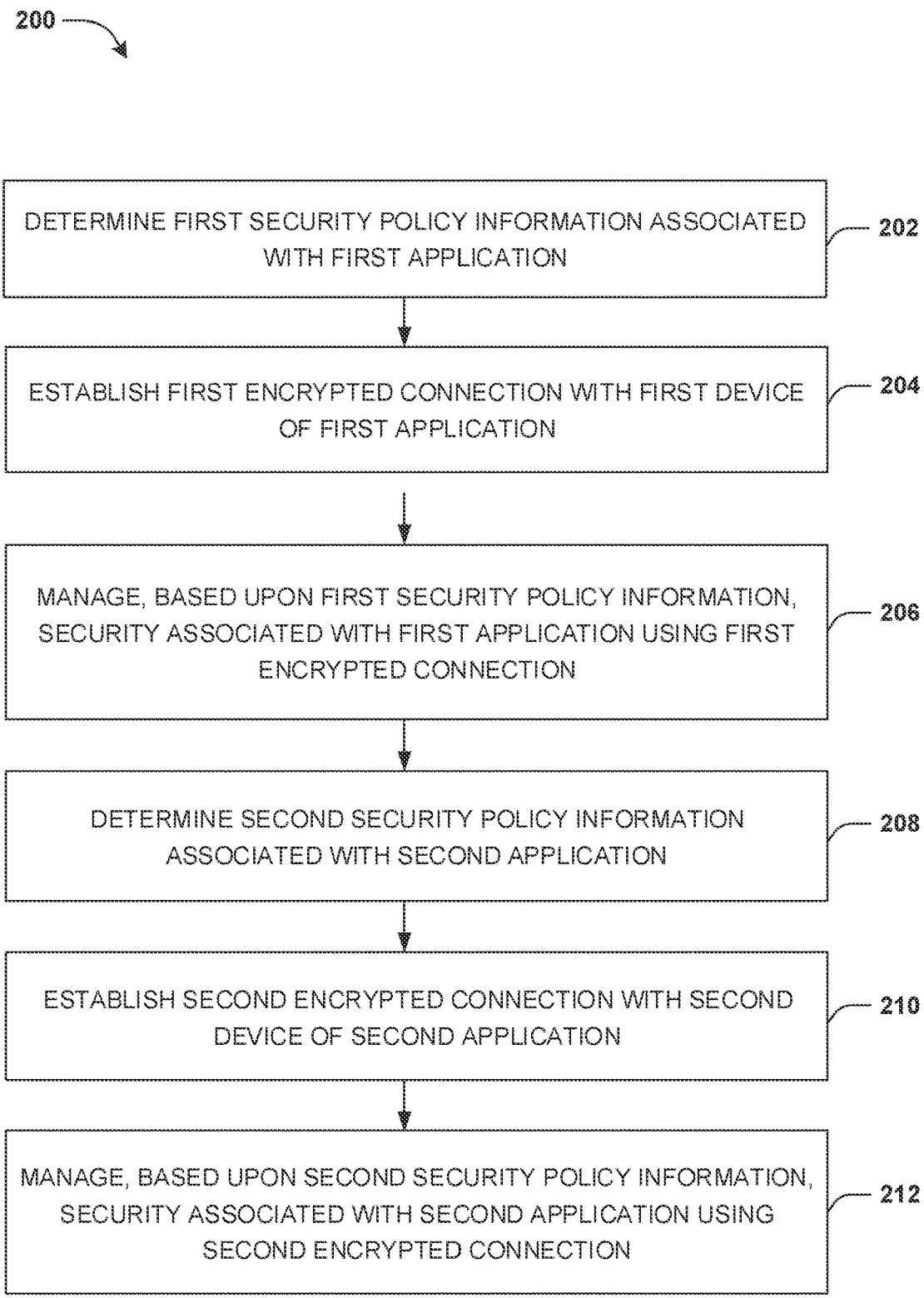
FIG. 2 is a flow chart illustrating an example method for managing security associated with applications in accordance with an embodiment.

An embodiment of managing security associated with applications is illustrated by an example method 200 of FIG. 2, and is further described in conjunction with FIG. 1. At 202 of FIG. 2, first security policy information associated with the first application may be determined (by the central security gateway 114, for example). In some examples, the first security policy information may be indicative of one or more first functions to be performed, by the central security gateway 114, for the first application. For example, the one or more first functions may comprise one or more first security functions and/or one or more other functions. Alternatively and/or additionally, the first security policy information may comprise first protocol information indicative of one or more first protocols with which the one or more first functions may be performed. Alternatively and/or additionally, the first security policy information may comprise first application information indicative of one or more features and/or properties of the first application, such as at least one of a name of the first application, an application category of the first application, an application type of the first application, a login method associated with the first application, a server root of the first application, a domain of the first application, a home page uniform resource locator (URL) of the first application, etc. Alternatively and/or additionally, the first security policy information may comprise one or more security requirements associated with the first application. In an example, the one or more security requirements may comprise one or more general security requirements associated with the first application, one or more protocol-based security requirements associated with the first application (e.g., the one or more protocol-based security requirements may be based upon one or more protocols used for providing services of the first application), one or more connection-based security requirements (e.g., the one or more connection-based security requirements may be based upon one or more types of connections used for providing services of the first application, such as at least one of 5G connections, cable connections, etc.), etc. In some examples, the one or more first functions may be determined based upon the one or more security requirements (e.g., the one or more first functions may be determined and/or selected such that the one or more security requirements are satisfied).

In some examples, the first security policy information may be stored on a security policy store (e.g., the central security gateway 114 may comprise the security policy store and/or the security policy store may be communicatively coupled to the central security gateway 114, for example). In an example, the one or more data stores 124 may comprise the security policy store. In an example, the security policy store may comprise a plurality of sets of security policy information associated with the plurality of applications. In an example, the plurality of sets of security policy information may comprise at least one of a first set of security policy information associated with the first application (e.g., the first set of security policy information may comprise the first security policy information), a second set of security policy information associated with the second application, a third set of security policy information associated with the third application, etc. In some examples, the plurality of sets of security policy information may be generated based upon information received from devices (e.g., administration devices of network administrators) associated with the plurality of applications (such as described herein with respect to FIGS. 4A-4B).

At 204 of FIG. 2, the first encrypted connection with the first application device may be established (by the central security gateway 114, for example). For example, the first encrypted connection may be established via a virtual private network (VPN) (e.g., a host to host VPN), via secure shell (SSH) tunneling, via a service mesh (e.g., a Kubernetes service mesh), and/or via one or more other techniques.

At 206 of FIG. 2, the central security gateway 114 may manage security associated with the first application based upon the first security policy information. In an example, the central security gateway 114 may manage security and/or perform one or more services for the first application based upon the one or more first functions indicated by the first security policy information. The central security gateway 114 may manage security and/or perform the one or more services for the first application using the one or more encrypted connections 128. In some examples, the central security gateway 114 may manage security and/or perform the one or more services for the first application transparently to the first application and/or transparently to client devices.

In an example, the one or more first functions may comprise an exemplary function of managing issuance and/or renewal of one or more public key certificates (e.g., digital certificates) for the first application and/or authenticating public key certificates associated with the first application. In some examples, the exemplary function may be performed for the first application using the certificate management module 118. For example, the central security gateway 114 may generate a first public key certificate for the first application. In an example, the first public key certificate is associated with verification of an identity of the first application (e.g., the first public key certificate may be used for proving that the first application owns a public key of the first public key certificate). In an example, the central security gateway 114 may generate the first public key certificate in response to receiving a request to generate and/or install a public key certificate. Alternatively and/or additionally, the central security gateway 114 may generate the first public key certificate in response to determining that a valid public key certificate for the first application is unavailable (and/or that issuance of a valid public key certificate for the first application is required). Alternatively and/or additionally, the central security gateway 114 may generate the first public key certificate in response to determining that a public key certificate of the first application is expired and/or determining that a duration of time until expiration of the public key certificate is less than a threshold duration of time. Alternatively and/or additionally, the central security gateway 114 may renew the first public key certificate in response to determining that the first public key certificate is expired and/or determining that a duration of time until expiration of the first public key certificate is less than a threshold duration of time. In some examples, the central security gateway 114 may sign the first public key certificate (e.g., the central security gateway 114 may act as a certificate authority to sign the first public key certificate). In some examples, the central security gateway 114 may store and/or install the first public key certificate in a first certificate store (e.g., the central security gateway 114 may comprise the first certificate store and/or the first certificate store may be communicatively coupled to the central security gateway 114, for example). In an example, the one or more data stores 124 may comprise the first certificate store.

In some examples, the central security gateway 114 may receive a certificate verification request from another client device, wherein the certificate verification request is indicative of a second public key certificate associated with the first application. In an example, the client device may transmit the certificate verification request in response to receiving the second public key certificate associated with the first application (in order to establish an SSL connection with the first application, for example). The client device may transmit the certificate verification request to the central security gateway 114 in order to verify that the second public key certificate is for the first application (e.g., the central security gateway 114 may act as a certificate authority to authenticate the second public key certificate). The central security gateway 114 may authenticate the second public key certificate based upon the public key certificate in the first certificate store (such as based upon a determination that the second public key certificate matches the public key certificate in the first certificate store). The central security gateway 114 may transmit a notification, to the client device, that the second public key certificate is authenticated. Based upon the notification, the client device may determine that the second public key certificate is authenticated and/or the client device may exchange data (e.g., encrypted data) with the first application.

Alternatively and/or additionally, the central security gateway 114 may transmit the first public key certificate to the first application device via the first encrypted connection (and/or one or more other application devices via one or more other encrypted connections). Alternatively and/or additionally, the central security gateway 114 may instruct, via the first encrypted connection, the first application device to install and/or store the first public key certificate in a second certificate store of the first application.

Alternatively and/or additionally, the central security gateway 114 may transmit a request for a public key certificate to a certificate authority device. In an example, in response to receiving the request, the certificate authority device may generate and/or sign the first public key certificate (e.g., signed public key certificate). The central security gateway 114 may receive the first public key certificate from the certificate authority device, for example.

In an example, the one or more first functions may comprise an exemplary function of managing, for the first application, TSL communication and/or SSL communication with a client device. In some examples, the exemplary function may be performed for the first application using the interface 104, the security policy management module 116 and/or the certificate management module 118. For example, the central security gateway 114 may perform one or more operations to establish a connection (e.g., a TSL connection and/or a SSL connection) between the client device and the first application (e.g., a connection between the client device and one or more application devices of the first set of application devices 126). In an example, the central security gateway 114 may receive a first message (e.g., a client hello message), from the client device, associated with initiating the connection. In some examples, the first message may be addressed to (and/or directed to) the first application and/or an application device of the first set of application devices 126 (and/or the central security gateway 114 may intercept and/or detect the first message). In an example, the first message may be indicative of at least one of one or more protocol versions (e.g., TLS and/or SSL protocol versions) supported by the client device, a client random, etc. In response to receiving the first message, the central security gateway 114 may transmit one or more messages to the client device. The one or more messages may comprise a second message (e.g., a server hello message) indicative of at least one of a protocol version (e.g., a TLS and/or SSL protocol version) of the one or more protocol versions (where the protocol version is selected for use in communication with the client device, for example), a server random (to be used in conjunction with the client random to generate an encryption key for encrypted communication with the client device, for example), etc. Alternatively and/or additionally, the one or more messages may comprise a third message (e.g., a certificate message) comprising a public key certificate for the first application. The public key certificate may be associated with verification of an identity of the first application. Alternatively and/or additionally, the one or more messages may comprise a fourth message (e.g., a server hello done message). In an example, based upon the second message, the third message and/or the fourth message, a connection (e.g., an encrypted connection) may be established between the client device and the central security gateway 114 (and/or the connection may be established between the client device and the first application, such as between the client device and an application device of the first set of application devices 126). In some examples, the client device may communicate with an application device of the first set of application devices 126 via the connection. In an example, the central security gateway 114 may receive a fifth message, from the client device, via the connection. The central security gateway 114 may transmit a sixth message, based upon the fifth message, to the first application device (and/or a different application device of the first set of application devices 126) via the first encrypted connection (and/or a different encrypted connection of the one or more encrypted connections 128). For example, the sixth message may comprise the fifth message (e.g., the central security gateway 114 may forward the fifth message to an application device of the first set of application devices 126). For example, the central security gateway 114 may intercept and/or detect messages received from the client device (where the messages are directed to and/or addressed to the first application, for example), and/or the central security gateway 114 may transmit (e.g., forward) the messages to one or more application devices of the first set of application devices 126.

In an example, the one or more first functions may comprise an exemplary function of managing a firewall for the first application. In some examples, the exemplary function may be performed for the first application using the interface 104 and/or the security policy management module 116. For example, the central security gateway 114 may control (e.g., open) the firewall to provide one or more client devices with access to one or more resources of the first application. Alternatively and/or additionally, the central security gateway 114 may control (e.g., open) the firewall to allow public access to the first application (and/or to one or more resources of the first application). Alternatively and/or additionally, the central security gateway 114 may control (e.g., open) the firewall to allow one or more client devices to connect to one or more infrastructure components (e.g., all infrastructure components) of the first application and/or the central security gateway 114. Alternatively and/or additionally, the central security gateway 114 may control (e.g., open) the firewall to expose one or more service ports of the first application (e.g., service ports 80 and/or 443) to one or more client devices and/or one or more applications.

In an example, the one or more first functions may comprise an exemplary function of controlling access to one or more resources of an application. In some examples, the exemplary function may be performed for the first application using the access control module 106 and/or the security policy management module 116. For example, access control performed by the central security gateway 114 may comprise permitting a client device to access one or more resources of the first application and/or preventing a client device from accessing one or more resources of the first application (such as to protect the one or more resources from unauthorized access). Alternatively and/or additionally, access control performed by the central security gateway 114 may comprise managing login of a client device to the first application (such as using an authentication device), such as described herein with respect to FIG. 2. Alternatively and/or additionally, access control performed by the central security gateway 114 may comprise managing SSO associated with multiple applications comprising the first application, such as described herein with respect to FIGS. 6-7.

In an example, the one or more first functions may comprise an exemplary function of determining and/or registering application information of the first application. In some examples, the exemplary function may be performed for the first application using the security policy management module 116. In an example, the application information may comprise a domain name of the first application, a device name of an application device of the first set of application devices 126 (e.g., a server name of the application device), a device IP address of the application device (e.g., a server IP address of the application device), etc. In an example, the central security gateway 114 may transmit a request for the domain name of the first application to a device (e.g., a DNS device, such as a DNS server). Alternatively and/or additionally, the central security gateway 114 may register at least some of the application information with a device (e.g., a DNS device, such as a DNS server). In some examples, the application information may be determined based upon the first security policy information.

In an example, the one or more first functions may comprise an exemplary function of performing a security audit (e.g., a security scan) of the first application. In some examples, the exemplary function may be performed for the first application using the security policy management module 116. For example, the central security gateway 114 may perform the security audit by accessing and/or scanning memory of one or more application devices of the first set of application devices 126. For example, the central security gateway 114 may access and/or scan the memory of the one or more application devices via the one or more encrypted connections 128. In some examples, the central security gateway 114 may analyze data stored on the memory for detection of malicious data (e.g., malicious software), such as at least one of malware, viruses, Trojan horses, spyware, etc. In some examples, in response to detecting malicious data, the central security gateway 114 may transmit a notification of the malicious data to an application device of the first set of application devices 126 (and/or the central security gateway 114 may instruct an application device of the first set of application devices 126 (via an encrypted connection of the one or more encrypted connections 128, for example) to remove and/or quarantine the malicious data. In some examples, the central security gateway 114 may perform security audits of the first application periodically, such as at a rate indicated by the first security policy information.

In an example, the one or more first functions may comprise an exemplary function of performing security monitoring of the first application. In some examples, the exemplary function may be performed for the first application using the security policy management module 116. For example, the central security gateway 114 may perform security monitoring by monitoring data, associated with the first application, received by the central security gateway 114. In some examples, the data may be part of the data 102 and/or the data may be directed and/or addressed to an application device of the first set of application devices 126. In an example, the central security gateway 114 may analyze the data for detection of malicious data (e.g., malicious software), such as at least one of malware, viruses, Trojan horses, spyware, etc. In some examples, in response to detecting malicious data (in the data), the central security gateway 114 may remove the malicious data (and/or the data) and/or the central security gateway 114 may block the malicious data (and/or the data) from being received by the first set of application devices 126 (e.g., the central security gateway 114 may not transmit and/or may not forward the malicious data (and/or the data) to an application device of the first set of application devices 126). Alternatively and/or additionally, in response to detecting malicious data (in the data), the central security gateway 114 may transmit the data (with the malicious data) and a notification that the data comprises the malicious data to an application device of the first set of application devices 126.

In an example, the one or more first functions may comprise an exemplary function of performing load balancing for the first application (such as to meet a high availability requirement of the first application). In some examples, the exemplary function may be performed for the first application using the request routing and/or load balancing module 108 and/or the traffic forwarding module 110. For example, the central security gateway 114 may perform load balancing for the first application by distributing at least one of connections, messages (e.g., at least one of requests, data packets, etc.), etc. of the data 102 across application devices of the first set of application devices 126. For example, in response to receiving a message (of the data 102), the central security gateway 114 may select an application device, of the first set of application devices 126, based upon a determination that a load (e.g., processing load and/or memory load) of the application device does not exceed a threshold load and/or based upon a determination that the application device is running and/or is not down. The central security gateway 114 may transmit the message to the application device (via an encrypted connection of the one or more encrypted connections 128) in response to selecting the application device. In an example, the central security gateway 114 may act as a reverse proxy to transmit (e.g., route) messages of the data 102 to the first set of application devices 126 (using the one or more encrypted connections 128, for example).

At 208 of FIG. 2, second security policy information (e.g., the second set of security policy information) associated with the second application may be determined (by the central security gateway 114, for example). In some examples, the second security policy information may be indicative of one or more second functions to be performed, by the central security gateway 114, for the second application. For example, the one or more second functions may comprise one or more second security functions and/or one or more other functions. Alternatively and/or additionally, the second security policy information may comprise second protocol information indicative of one or more second protocols with which the one or more second functions may be performed. Alternatively and/or additionally, the second security policy information may comprise second application information indicative of one or more features and/or properties of the second application. At 210 of FIG. 2, a second encrypted connection with a second application device of the second application may be established (by the central security gateway 114, for example). For example, the central security gateway 114 may establish one or more second encrypted connections, comprising the second encrypted connection, with the second set of application devices of the second application. At 212 of FIG. 2, the central security gateway 114 may manage security associated with the second application based upon the second security policy information. In an example, the central security gateway 114 manage security and/or perform one or more services for the second application based upon the one or more second functions indicated by the second security policy information. The central security gateway 114 may manage security and/or perform the one or more services for the second application using the encrypted connection (and/or one or more other encrypted connections between the central security gateway 114 and the second set of application devices). At least one of acts 208-212 may be performed using one or more of the techniques described herein with respect to at least one of acts 202-206.

In some examples, the central security gateway 114 may receive, intercept and/or detect data (e.g., at least one of transmissions of data by client devices, public data, private data, public traffic, private traffic etc.) that is directed to and/or addressed to the first application (and/or the first set of application devices 126). For example, the central security gateway 114 may receive, intercept and/or detect all data (transmitted by client devices, for example) that is directed to and/or addressed to the first application (and/or the first set of application devices 126). In response to receiving, intercepting and/or detecting a transmission of data from a client device that is directed to and/or addressed to the first application, the central security gateway 114 may perform one or more operations based upon the transmission of data, such as authenticating the client device based upon the transmission of data, transmitting (e.g., forwarding) the transmission of data to an application device of the first set of application devices 126 (using an encrypted connection of the one or more encrypted connections 128, for example) and/or one or more other operations.

In some examples, the central security gateway 114 may receive, intercept and/or detect transmissions of data, by the first set of application devices 126, that are directed to and/or addressed to client devices. For example, the central security gateway 114 may receive, intercept and/or detect all transmissions of data, by the first set of application devices 126, that are directed to and/or addressed to client devices. In response to receiving, intercepting and/or detecting a transmission of data from an application device of the first set of application devices 126 that is directed to and/or addressed to a client device, the central security gateway 114 may perform one or more operations based upon the transmission of data, such as transmitting (e.g., forwarding) the transmission of data to the client device and/or one or more other operations.

In some examples, the central security gateway 114 may receive, intercept and/or detect data (e.g., at least one of transmissions of data by client devices, public data, private data, public traffic, private traffic etc.) that is directed to and/or addressed to the second application (and/or the second set of application devices). For example, the central security gateway 114 may receive, intercept and/or detect all data (transmitted by client devices, for example) that is directed to and/or addressed to the second application (and/or the second set of application devices). In response to receiving, intercepting and/or detecting a transmission of data from a client device that is directed to and/or addressed to the second application, the central security gateway 114 may perform one or more operations based upon the transmission of data, such as authenticating the client device based upon the transmission of data, transmitting (e.g., forwarding) the transmission of data to an application device of the second set of application devices (using an encrypted connection between the central security gateway 114 and the application device, for example) and/or one or more other operations.

In some examples, the central security gateway 114 may receive, intercept and/or detect transmissions of data, by the second set of application devices, that are directed to and/or addressed to client devices. For example, the central security gateway 114 may receive, intercept and/or detect all transmissions of data, by the second set of application devices, that are directed to and/or addressed to client devices. In response to receiving, intercepting and/or detecting a transmission of data from an application device of the second set of application devices that is directed to and/or addressed to a client device, the central security gateway 114 may perform one or more operations based upon the transmission of data, such as transmitting (e.g., forwarding) the transmission of data to the client device and/or one or more other operations.

Figure 3:
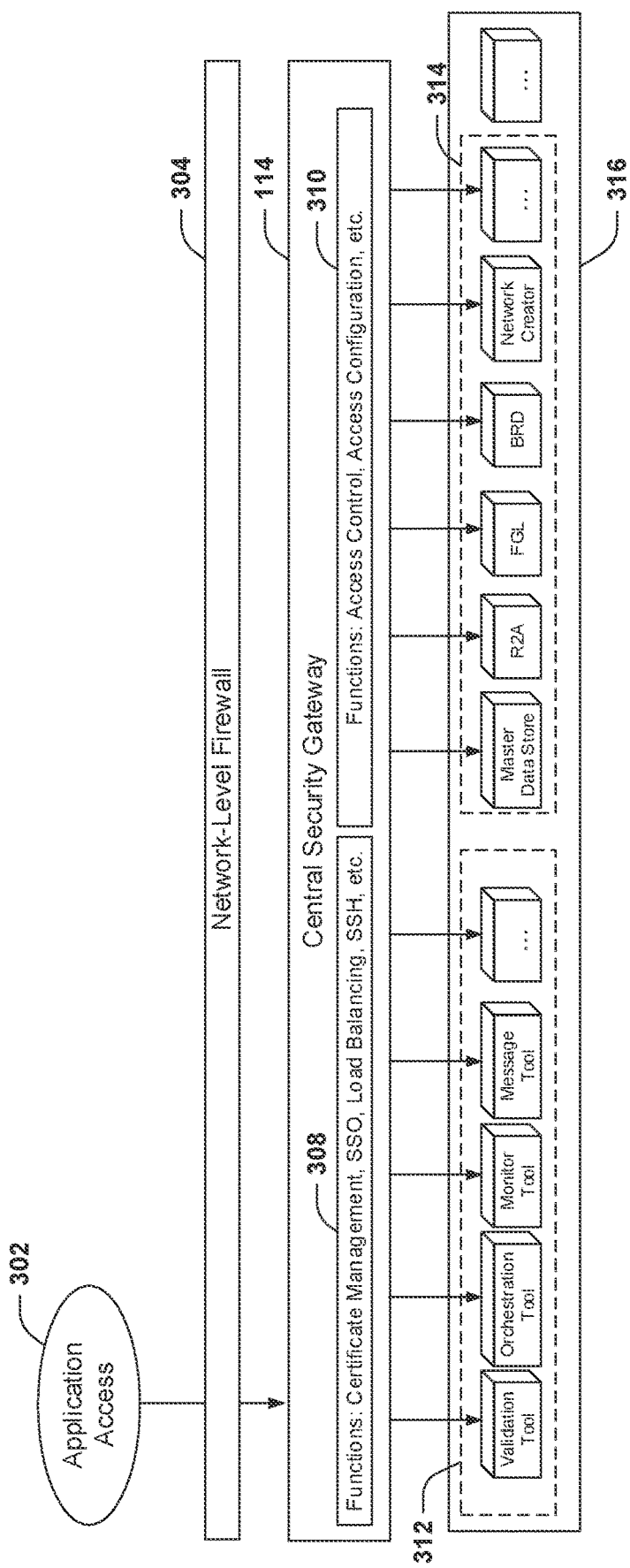
FIG. 3 is a diagram illustrating an example system comprising a central security gateway in accordance with an embodiment.

FIG. 3 illustrates an example of a system 301 comprising the central security gateway 114. The central security gateway 114 performs functions for applications of the plurality of applications (shown with reference number 316). In an example, functions performed by the central security gateway 114 may vary across applications of the plurality of applications 316. For example, the central security gateway 114 may perform a first set of functions 308 (e.g., at least one of certificate management, SSO, load balancing, SSH tunneling, etc.) for applications of a first set of applications 312, the central security gateway 114 may perform a second set of functions 310 (e.g., at least one of access control, access configuration, etc.) for a second set of applications 314, etc. For example, the central security gateway 114 may perform the first set of functions 308 for applications of the first set of applications 312 based upon sets of security policy information associated with the applications indicating the first set of functions 308. Alternatively and/or additionally, the central security gateway 114 may perform the second set of functions 310 for applications of the second set of applications 314 based upon sets of security policy information associated with the applications indicating the second set of functions 310. In some examples, access 302 to resources of applications of the plurality of applications 316 may be provided by the central security gateway 114 via a firewall 304 (e.g., a network-level firewall).

FIGS. 4A-4B illustrate interfaces provided for submitting information associated with an application. FIG. 4A illustrates a first interface 400 being displayed via a graphical user interface of a device (e.g., an administration device of a network administrator). In some examples, the first interface 400 may be used for inputting a first set of information associated with the first application. For example, the first interface 400 may comprise one or more input fields (e.g., text boxes) and/or one or more selectable inputs for inputting the first set of information. For example, the first set of information may comprise at least one of a code name of the first application, a display name of the first application, an application category of the first application, an application type of the first application, a login method associated with the first application, a server root of the first application, a domain of the first application, a home page URL of the first application, an application description of the first application, etc. In some examples, the first set of information may be submitted in response to a selection of a selectable input 402.

FIG. 4B illustrates a second interface 450 being displayed via the graphical user interface of the device. In some examples, the second interface 450 may be used for inputting a second set of information associated with an application device of the first set of application devices 126 (e.g., an application server that hosts the first application). For example, the second interface 450 may comprise one or more input fields and/or one or more selectable inputs for inputting the second set of information. For example, the second set of information may comprise at least one of a name of the application device (e.g., a server host name), a routing path, a load balancing type, a certificate file (e.g., a SSL certificate file), a private key (e.g., a SSL private key file), etc. In some examples, the second set of information may be submitted in response to a selection of a selectable input 452.

In some examples, the first security policy information associated with the first application may be based upon (and/or may comprise) the first set of information and/or the second set of information. Alternatively and/or additionally, the one or more first functions (performed by the central security gateway 114 for the first application) may be determined based upon the first set of information, the second set of information and/or a third set of information. In an example, the third set of information may be received via an interface (not shown) and/or may be indicative of one or more services to be performed by the central security gateway 114 for the first application (e.g., the one or more first functions may be determined based upon and/or may correspond to the one or more services).

Figure 5:
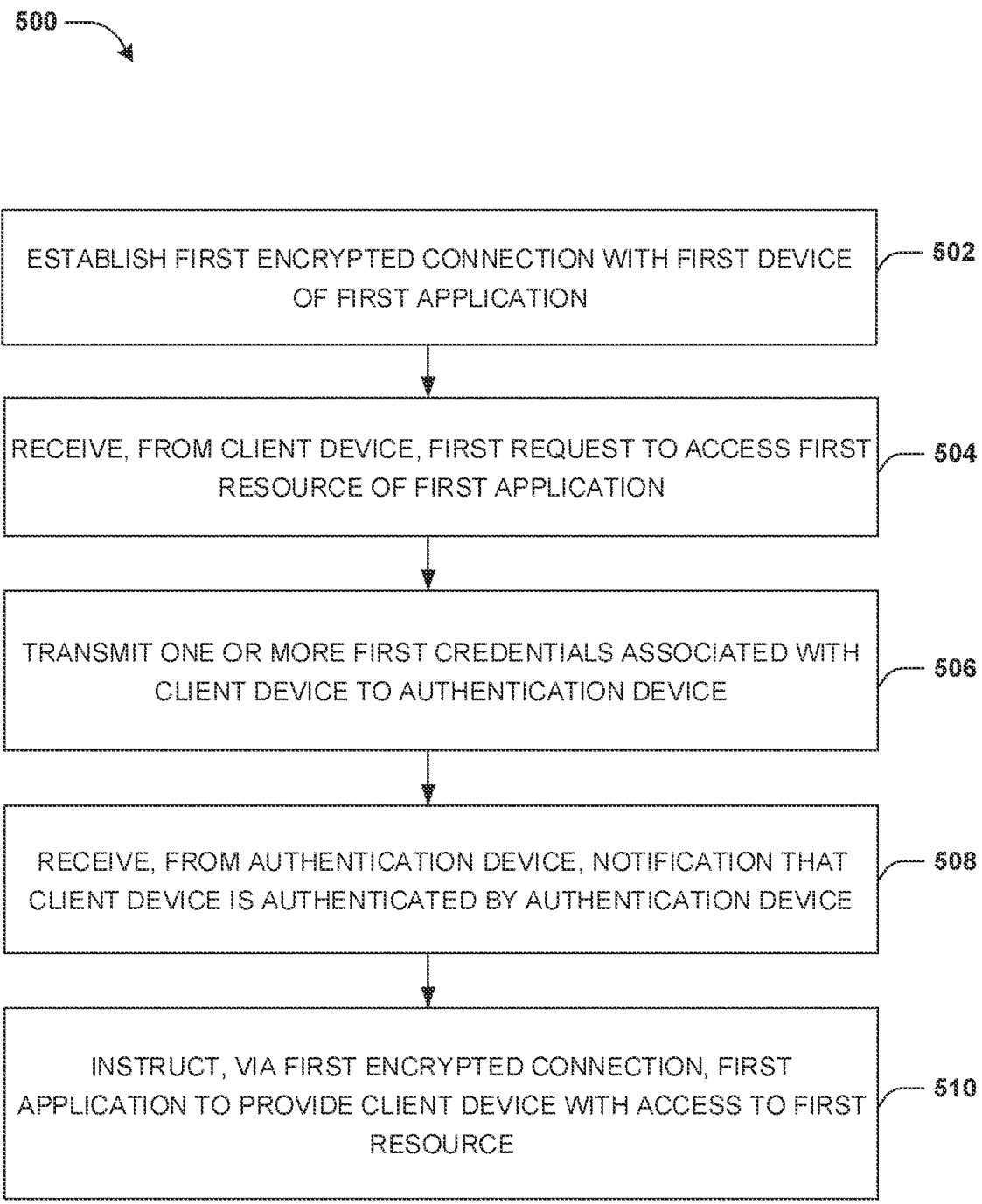
FIG. 5 is a flow chart illustrating a method for controlling access to resources of applications in accordance with an embodiment.

An embodiment of controlling access to resources of applications is illustrated by an example method 500 of FIG. 5, and is further described in conjunction with FIG. 1. At 502 of FIG. 5, the first encrypted connection with the first application device may be established (by the central security gateway 114, for example). At 504 of FIG. 5, the central security gateway 114 may receive, from a client device, a first request to access a first resource of the first application. In an example, the first request may be a login request to login to the first application. In some examples, the first request may be addressed to (and/or directed to) the first application and/or an application device of the first set of application devices 126 (and/or the central security gateway 114 may intercept and/or detect the first request).

At 506, the central security gateway 114 may transmit one or more first credentials (e.g., one or more user credentials, such as at least one of a username, a password, etc.) associated with the client device to an authentication device of the one or more authentication devices 122. In some examples, the one or more first credentials may be received from the client device. For example, the central security gateway 114 may provide the client device with an interface (e.g., a web page) that enables a user of the client device to input the one or more first credentials and submit the one or more first credentials to the central security gateway 114 (e.g., the one or more first credentials may be included in the first request and/or a different message transmitted to the central security gateway 114).

At 508, the central security gateway 114 may receive, from the authentication device, a notification that the client device is authenticated by the authentication device. In some examples, the authentication device may be a LDAP device (e.g., an LDAP server). For example, the central security gateway 114 may communicate with the authentication device (and/or the client device may be authenticated) using LDAP protocol. Alternatively and/or additionally, the authentication device may be an Active Directory (AD) device (e.g., an AD server), and/or the central security gateway 114 may communicate with the authentication device (and/or the client device may be authenticated) using AD protocol. In an example, the authentication device may comprise a directory of user profiles, wherein a user profile of the directory of user profiles may be indicative of a set of user credentials. The authentication device may authenticate the client device based upon the one or more first credentials and/or the directory of user profiles (e.g., the client device may be authenticated based upon a determination that the one or more first credentials matches a set of user credentials of a user profile of the directory of user profiles).

At 510, the central security gateway 114 may instruct, via the first encrypted connection, the first application (e.g., the first application device) to provide the client device with access to the first resource based upon the notification that the client device is authenticated by the authentication device. In response to determining that the client device is authenticated, the central security gateway 114 may transmit, via an encrypted connection of the one or more encrypted connections 128, a notification that the client device is authenticated to an application device of the first set of application devices 126. Alternatively and/or additionally, in response to determining that the client device is authenticated, the central security gateway 114 may transmit permission information (e.g., permission information generated by the central security gateway 114 and/or the first application) to the client device. The permission information may be associated with accessing the first application. For example, the permission information may comprise at least one of a cookie (e.g., a browser cookie), a token, etc. The client device may access one or more resources (comprising the first resource, for example) of the first application using the permission information.

Figure 6:
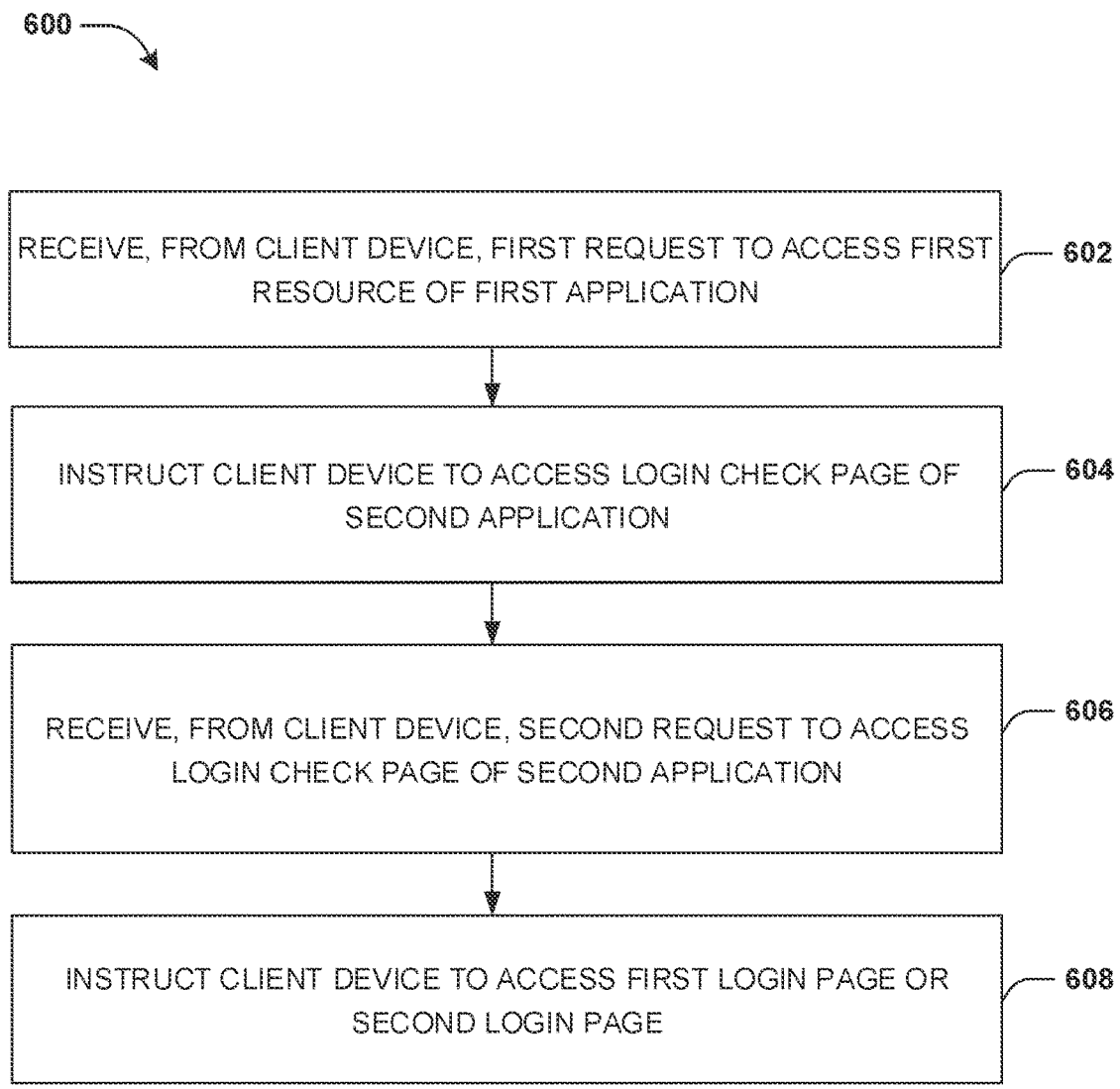
FIG. 6 is a flow chart illustrating a method for providing a client device with access to resources of multiple applications and/or domains via single sign-on (SSO) in accordance with an embodiment.

An embodiment of providing a client device with access to resources of multiple applications and/or domains via SSO is illustrated by an example method 600 of FIG. 6, and is further described in conjunction with FIG. 1. At 602 of FIG. 6, the central security gateway 114 may receive, from a client device a first request to access a first resource of the first application. In some examples, the client device may transmit the first request to access a first web page, of the first application, associated with the first resource (e.g., the first web page may be used by authenticated devices to access the first resource). Alternatively and/or additionally, the client device may transmit the first request in response to accessing the first web page. The first web page may be associated with (and/or may comprise) the first resource and/or one or more other resources. In an example, the first request may be a login request to login to the first application. In some examples, the first request may be addressed to (and/or directed to) the first application and/or an application device of the first set of application devices 126 (and/or the central security gateway 114 may intercept and/or detect the first request).

In some examples, one or more first credentials (e.g., one or more user credentials, such as at least one of a username, a password, biometric, etc.) associated with the client device may be used for authorizing the client device to access resources of each application of a set of multiple applications comprising the first application and a second application. In some examples, applications of the set of multiple applications may have different domains. For example, a first domain of the first application may be different than a second domain of the second application. In an example, the second application may be a sign-in application that may be used for logging the client device into applications of the set of multiple applications (such as the first application). In some examples, the central security gateway 114 may provide SSO functionality for the set of multiple applications and/or multiple domains of the set of multiple applications based upon a directory of SSO profiles. In an example, the directory of SSO profiles may be stored on the central security gateway 114 and/or on an SSO device (e.g., an SSO server) of the one or more SSO devices 120. For example, an SSO profile of the directory of SSO profiles may be indicative of providing SSO functionality for the set of multiple applications and/or the multiple domains.

In some examples, the central security gateway 114 may determine, based upon the first request, whether the client device has a valid session (e.g., an active user session) with the first application. The central security gateway 114 may analyze the first request to determine whether the first request comprises permission information (e.g., at least one of a session token, a session cookie, etc.) associated with the first application. For example, the central security gateway 114 may determine that the client device has a valid session with the first application based upon a determination that the first request comprises valid permission information (e.g., at least one of a valid session token, a valid session cookie, etc.). In some examples, in response to determining that the client device has a valid session with the first application (and/or in response to determining that the first request comprises the valid permission information), the central security gateway 114 may provide the client device with access to the first resource and/or one or more other resources of the first application (and/or the central security gateway 114 may instruct the first application to provide the client device with access to the first resource and/or the one or more other resources). For example, the central security gateway 114 may transmit (e.g., forward) the first request to an application device of the first set of application devices 126 (via an encrypted connection of the one or more encrypted connections 128). Alternatively and/or additionally, the central security gateway 114 may determine that the client device does not have a valid session with the first application based upon a determination that the first request does not comprise valid permission information (e.g., at least one of a valid session token, a valid session cookie, etc.).

At 604 of FIG. 6, the central security gateway 114 may instruct the client device to access a login check page of the second application. For example, the central security gateway 114 may redirect the client device to the login check page. In some examples, the central security gateway 114 may instruct the client device to access the login check page in response to determining that the client device does not have a valid session with the first application (and/or in response to determining that the first request does not comprise valid permission information).

At 606 of FIG. 6, the central security gateway 114 may receive, from the client device, a second request to access the login check page of the second application. In some examples, the second request may be addressed to (and/or directed to) the second application and/or an application device of the second application (and/or the central security gateway 114 may intercept and/or detect the second request). In an example, the client device may transmit the second request in response being instructed to access the login check page (e.g., in response to being redirected to the login check page).

At 608 of FIG. 6, the central security gateway 114 may instruct the client device to access a first login page (e.g., an auto-login page) of the first application or a second login page of the second application. In some examples, whether the client device is instructed to access the first login page or instructed to access the second login page is based upon whether the client device has a valid session with the second application. For example, the central security gateway 114 may determine, based upon the second request, whether the client device has a valid session with the second application. The central security gateway 114 may analyze the second request to determine whether the second request comprises valid permission information (e.g., at least one of a session token, a session cookie, etc.) associated with the second application. For example, the central security gateway 114 may determine that the client device has a valid session with the second application based upon a determination that the second request comprises first permission information (e.g., at least one of a first session token, a valid session cookie, etc.), where the first permission information is valid (e.g., the first permission information and/or the valid session are active and/or are not expired).

In some examples, at 608, the central security gateway 114 may instruct the client device to access the first login page of the first application based upon a determination that the client device has a valid session with the second application (and/or in response to determining that the second request comprises the first permission information). In an example, the first login page may be associated with the first domain. Alternatively and/or additionally, the first login page may be created by the central security gateway 114. Alternatively and/or additionally, in response to determining that the client device has a valid session with the second application (and/or in response to determining that the second request comprises the first permission information), the central security gateway 114 may transmit second permission information, associated with accessing the first application, to the client device. In some examples, the second permission information may comprise at least one of a second session token (e.g., a one-time encrypted secret token), a second session cookie, etc.

In some examples, the central security gateway 114 may receive, from the client device, a third request to access the first login page of the first application. In some examples, the third request may be addressed to (and/or directed to) the first application and/or an application device of the first set of application devices 126 (and/or the central security gateway 114 may intercept and/or detect the third request). In an example, the client device may transmit the third request in response being instructed to access the first login page (e.g., in response to being redirected to the first login page). In some examples, the third request may comprise second permission information. The central security gateway 114 may validate the second permission information based upon the first permission information (such as based upon a determination that the second permission information matches the first permission information). For example, the second permission information may comprise a session token (e.g., a one-time encrypted secret token). The central security gateway 114 may decrypt the session token, validate the session token (such as based upon a determination that the session token matches the second session token) and/or determine user information associated with the client device based upon the session token (e.g., the user information may be embedded in the session token).

In some examples, in response to validating the second permission information, the client device may be provided with access to the first resource and/or one or more other resources of the first application. In some examples, resources to which the client device is provided with access may be determined based upon the user information. The central security gateway 114 may instruct the client device to access the first web page. For example, the central security gateway 114 may redirect the client device to the first web page. In some examples, the central security gateway 114 may receive, from the client device, a fourth request to access the first web page of the first application. In some examples, the fourth request may be addressed to (and/or directed to) the first application and/or an application device of the first set of application devices 126 (and/or the central security gateway 114 may intercept and/or detect the fourth request). In an example, the client device may transmit the fourth request in response being instructed to access the first web page (e.g., in response to being redirected to the first web page). In some examples, the fourth request may comprise third permission information. The central security gateway 114 may validate the third permission information and/or may determine that the first client device has a valid session with the first application based upon the third permission information (such as based upon a determination that the third permission information matches the first permission information). In some examples, in response to determining that the client device has a valid session with the first application (and/or in response to determining that the third permission information of the fourth request is valid), the central security gateway 114 may provide the client device with access to the first resource and/or one or more other resources of the first application (and/or the central security gateway 114 may instruct the first application to provide the client device with access to the first resource and/or the one or more other resources). For example, the central security gateway 114 may transmit (e.g., forward) the fourth request to an application device of the first set of application devices 126 (via an encrypted connection of the one or more encrypted connections 128).

Alternatively and/or additionally, the central security gateway 114 may determine, based upon the second request, that the client device does not have a valid session with the second application (such as based upon a determination that the second request does not comprise valid permission information). In some examples, at act 608, the central security gateway 114 may instruct the client device to access the second login page of the second application based upon a determination that the client device does not have a valid session with the second application. The one or more first user credentials may be input via the second login page. The central security gateway 114 may receive the one or more first user credentials from the client device. For example, the second login page may provide an interface that enables a user of the client device to input the one or more first credentials and submit the one or more first credentials to the central security gateway 114. In some examples, the client device may be authenticated based upon the one or more first credentials (such as using one or more of the techniques described herein with respect to FIG. 5). In response to authenticating the client device, the central security gateway 114 may instruct the client device to access the first login page of the first application. Alternatively and/or additionally, in response to authenticating the client device, the central security gateway 114 may transmit the second permission information, associated with accessing the first application, to the client device. The central security gateway 114 may receive, from the client device, the third request to access the first login page of the first application (after instructing the client device to access the first login page of the first application and/or after transmitting the second permission information, for example). The central security gateway 114 may validate the second permission information comprised in the third request based upon the first permission information. In response to validating the second permission information, the client device may be provided with access to the first resource and/or one or more other resources of the first application. For example, the central security gateway 114 may instruct the client device to access the first web page. For example, the central security gateway 114 may redirect the client device to the first web page. The central security gateway 114 may receive, from the client device, the fourth request to access the first web page of the first application (e.g., the client device may transmit the fourth request in response being instructed to access the first web page). The central security gateway 114 may validate the third permission information comprised in the fourth request and/or may determine that the first client device has a valid session with the first application based upon the third permission information (such as based upon a determination that the third permission information matches the first permission information). In some examples, in response to determining that the client device has a valid session with the first application (and/or in response to determining that the third permission information of the fourth request is valid), the central security gateway 114 may provide the client device with access to the first resource and/or one or more other resources of the first application (and/or the central security gateway 114 may instruct the first application to provide the client device with access to the first resource and/or the one or more other resources). For example, the central security gateway 114 may transmit (e.g., forward) the fourth request to an application device of the first set of application devices 126 (via an encrypted connection of the one or more encrypted connections 128).

In some examples, the client device may be provided with access to resources of one or more applications, other than the first application, of the set of multiple applications (and/or the client device may be provided with access to resources of one or more domains, other than the first domain, of the multiple domains) using one or more of the techniques described herein with respect to providing the client device with access to one or more resources of the first application and/or the first domain. For example, while the client device has a valid session with the second application (and/or a different application of the multiple applications), the client device may login to the multiple applications and/or the client device may be provided with access to resources of the set of multiple applications (and/or resources of the multiple domains), without having to submit the one or more first credentials.

Figure 7:
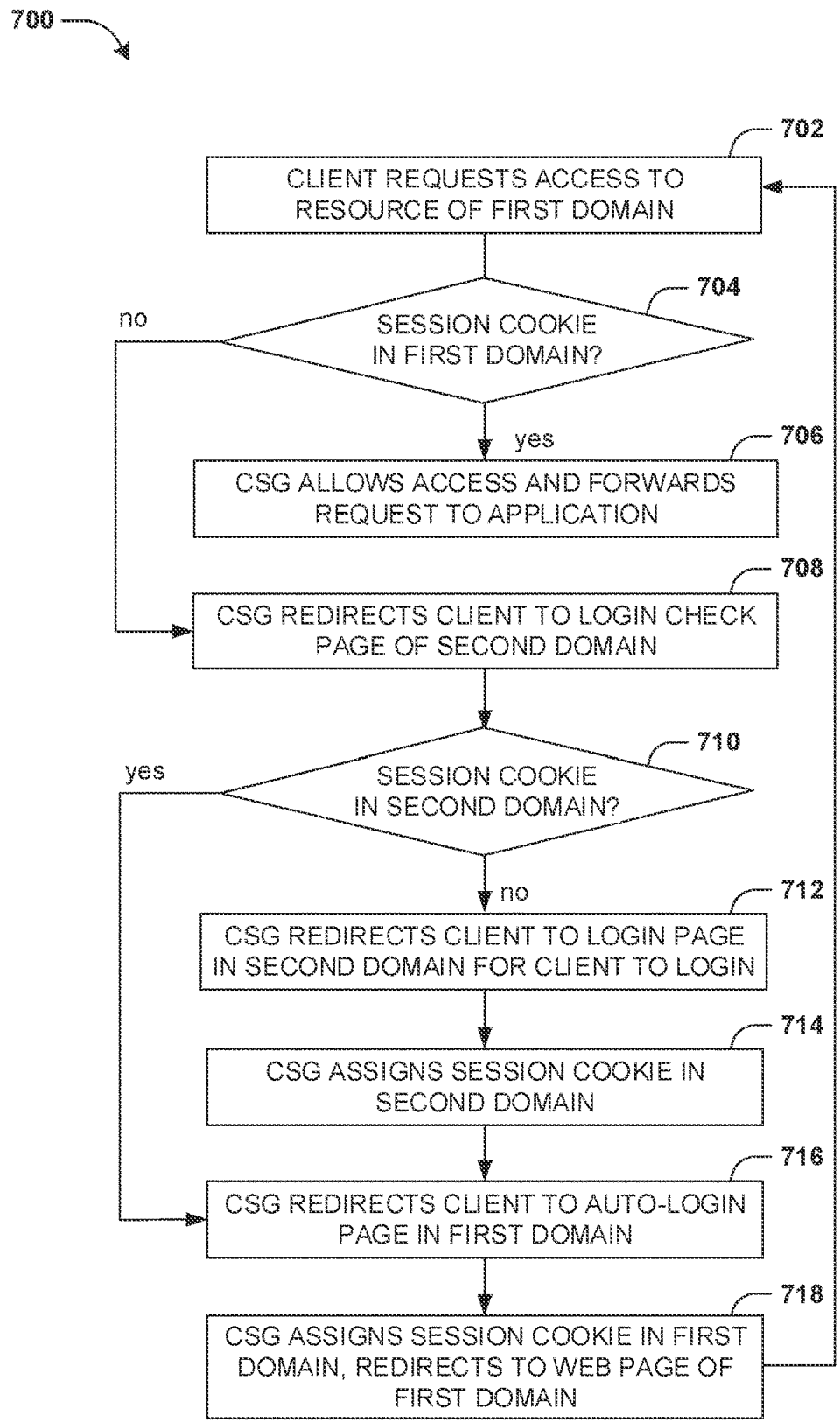
FIG. 7 is a flow chart illustrating a method, in accordance with an embodiment, for providing a client device with access to resources of multiple applications and/or domains via SSO.

An embodiment of providing a client device with access to resources of multiple applications and/or domains via SSO is illustrated by method 700 of FIG. 7, and is further described in conjunction with FIG. 1. At 702, a client device requests to access a first resource (e.g., a protected resource) of a first domain (e.g., application domain). The first domain may be a domain of the first application. The client device may request to access the first resource by transmitting a first request to the central security gateway (CSG) 114 and/or the first application. The central security gateway 114 may receive the first request and/or may determine, at 704, whether the first request is indicative of a session cookie (e.g., a valid session cookie) associated with the first domain (e.g., a session cookie in the first domain). If the central security gateway 114 determines that the first request is indicative of a session cookie associated with the first domain, the central security gateway 114 may, at 706, allow access to the first resource (and/or one or more other resources of the first domain) and/or transmit (e.g., forward) the first request to an application device of the first set of application devices 126 (via an encrypted connection of the one or more encrypted connections 128, for example). If the central security gateway 114 determines that the first request is not indicative of a session cookie associated with the first domain, the central security gateway 114 may, at 708, redirect the client device to a login check page of a second domain (e.g., a sign-in domain), such as a domain of a second application (e.g., a sign-in application). The central security gateway 114 may determine, at 710, whether a second request (transmitted by the client device in response to being redirected to the login check page, for example) is indicative of a session cookie (e.g., a valid session cookie) associated with the second domain (e.g., a session cookie in the second domain). If the central security gateway 114 determines that the second request is indicative of a session cookie associated with the second domain, the central security gateway 114 may redirect clients to an auto-login page in a first domain at 716. If the central security gateway 114 determines that the second request is not indicative of a session cookie associated with the second domain, the central security gateway 114 may redirect the client device to a login page of the second domain at 712, wherein the client device (and/or a user of the client device) may submit one or more first credentials via the login page to login. At 714, the central security gateway 114 may assign a session cookie associated with the second domain (e.g., a session cookie in the second domain) to the client device (such as in response to authenticating the client device based upon the one or more first credentials). At 716, the central security gateway 114 may redirect the client to an auto-login page in the first domain. At 718, the central security gateway 114 may assign a second session cookie associated with the first domain to the client device (e.g., a second session cookie in the first domain) and/or may redirect the client device to a web page in the first domain (e.g., the web page may be associated with (and/or may comprise) the first resource and/or one or more other resources). In response to assigning the second session cookie to the client device, the client device may again perform, at 702, requesting access to the first resource (and/or one or more other resources) of the first domain. The client device may request to access the first resource (and/or the one or more other resources) by transmitting a third request to the central security gateway 114 and/or the first application. The central security gateway 114 may receive the third request and/or may determine, at 704, that the third request is indicative of a session cookie (e.g., a valid session cookie, such as the second session cookie) associated with the first domain (e.g., a session cookie in the first domain). In response to determining that the third request is indicative of the session cookie associated with the first domain, the central security gateway 114 may, at 706, allow access to the first resource (and/or one or more other resources of the first domain) and/or transmit (e.g., forward) the third request to an application device of the first set of application devices 126 (via an encrypted connection of the one or more encrypted connections 128, for example).

Implementation of at least some of the disclosed subject matter may lead to more effective management of security of applications. For example, by managing security of an application automatically using the central security gateway 114, less integration of the application with multiple components to manage the security of the application is required. Alternatively and/or additionally, implementation of at least some of the disclosed subject matter may include faster communication with client devices. For example, by enabling the central security gateway 114 to automatically establish a connection (e.g., a TSL connection and/or a SSL connection) between a client device and the application, the connection may be established more quickly than relying upon application devices of the application to establish the connection (such as a result of the central security gateway 114 being closer to the client device than the application devices). Alternatively and/or additionally, implementation of at least some of the disclosed subject matter may include a reduction in network traffic and/or a reduction in inter-device messaging. For example, by automatically managing security (such as access control and/or one or more other functions) of an application using the central security gateway 114, less data may be transmitted to and/or from application devices of the application. Alternatively and/or additionally, implementation of at least some of the disclosed subject matter may lead to benefits including improved usability of a display (e.g., as a result of the central security gateway 114 handling SSO functionality for multiple applications such that a client device may not be required to submit separate sets of user credentials for each application of the multiple applications to access resources of the multiple applications).

According to some embodiments, a method is provided. The method includes receiving, by a central security gateway and from a client device, a first request to access a first resource of a first application; instructing, by the central security gateway, the client device to access a login check page of a second application; receiving, by the central security gateway and from the client device, a second request to access the login check page of the second application; and instructing, by the central security gateway, the client device to access a first login page of the first application or a second login page of the second application.

According to some embodiments, the method includes determining, by the central security gateway and based upon the second request, whether the client device has a valid session with the second application, wherein the client device is instructed to access the second login page based upon a determination that the client device does not have a valid session with the second application.

According to some embodiments, the method includes determining, by the central security gateway and based upon the second request, whether the client device has a valid session with the second application, wherein the client device is instructed to access the first login page based upon a determination that the client device has a first valid session with the second application.

According to some embodiments, the method includes responsive to the determination that the client device has the first valid session with the second application, transmitting, by the central security gateway and to the client device, permission information associated with accessing the first application.

According to some embodiments, the method includes receiving, by the central security gateway and from the client device, a third request to access the first login page of the second application; validating, by the central security gateway and based upon the permission information, second permission information comprised in the third request; and providing, based upon validating the second permission information, the client device with access to the first resource.

According to some embodiments, the method includes establishing, by the central security gateway, a first encrypted connection with a first device of the first application; and instructing, by the central security gateway and via the first encrypted connection, the first application to provide the client device with access to the first resource.

According to some embodiments, the establishing the first encrypted connection is performed via a host to host VPN, SSH tunneling and/or a service mesh.

According to some embodiments, the method includes determining, by the central security gateway and based upon the first request, whether the client device has a valid session with the first application, wherein instructing the client device to access the login check page is performed in response to determining that the client device does not have a valid session with the first application.

According to some embodiments, a first domain of the first application is different than a second domain of the second application.

According to some embodiments, a method is provided. The method includes determining, by a central security gateway, first security policy information associated with a first application; establishing, by the central security gateway, a first encrypted connection with a first device of the first application; managing, by the central security gateway and based upon the first security policy information, security associated with the first application, wherein managing security associated with the first application is performed using the first encrypted connection; determining, by the central security gateway, second security policy information associated with a second application; establishing, by the central security gateway, a second encrypted connection with a second device of the second application; and managing, by the central security gateway and based upon the second security policy information, security associated with the second application, wherein managing security associated with the second application is performed using the second encrypted connection.

According to some embodiments, managing security associated with the first application includes generating, by the central security gateway, a public key certificate for the first application, wherein the public key certificate is associated with verification of an identity of the first application; and transmitting, by the central security gateway and via the first encrypted connection, the public key certificate to the first device.

According to some embodiments, managing security associated with the first application includes storing, by the central security gateway, the public key certificate in a certificate store; receiving, by the central security gateway and from a client device, a certificate verification request indicative of a second public key certificate; authenticating, by the central security gateway, the second public key certificate based upon the public key certificate in the certificate store; and transmitting, by the central security gateway, a notification, to the client device, that the second public key certificate is authenticated.

According to some embodiments, managing security associated with the first application includes receiving, by the central security gateway, a first message, from a client device, associated with initiating a connection between the client device and the first application; transmitting, by the central security gateway, a second message to the client device, wherein the second message includes a public key certificate for the first application and the public key certificate is associated with verification of an identity of the first application; receiving, by the central security gateway and from the client device, a third message; and transmitting, by the central security gateway and via the first encrypted connection, a fourth message to the first device, wherein the fourth message is based upon the third message.

According to some embodiments, managing security associated with the first application includes receiving, by the central security gateway and from a client device, a first request to access a first resource of the first application; transmitting, by the central security gateway, one or more first credentials associated with the client device to an authentication device; receiving, by the central security gateway and from the authentication device, a notification that the client device is authenticated by the authentication device; and instructing, by the central security gateway and via the first encrypted connection, the first application to provide the client device with access to the first resource based upon the notification that the client device is authenticated by the authentication device.

According to some embodiments, the authentication device is a LDAP device.

According to some embodiments, managing security associated with the first application includes at least two of managing, by the central security gateway and for the first application, TSL communication with a first client device and/or SSL communication with a second client device; managing, by the central security gateway, issuance and/or renewal of a public key certificate for the first application; controlling, by the central security gateway, access of a third client device to one or more resources of the first application; performing, by the central security gateway, a security audit of the first application; or performing, by the central security gateway, security monitoring of the first application.

According to some embodiments, establishing the first encrypted connection is performed via a host to host VPN, SSH tunneling and/or a service mesh.

According to some embodiments, a method is provided. The method includes establishing, by a central security gateway, a first encrypted connection with a first device of a first application; receiving, by the central security gateway and from a client device, a first request to access a first resource of the first application; transmitting, by the central security gateway, one or more first credentials associated with the client device to an authentication device; receiving, by the central security gateway and from the authentication device, a notification that the client device is authenticated by the authentication device; and instructing, by the central security gateway and via the first encrypted connection, the first application to provide the client device with access to the first resource based upon the notification that the client device is authenticated by the authentication device.

According to some embodiments, the authentication device is a LDAP device.

According to some embodiments, the method includes establishing, by the central security gateway, a second encrypted connection with a second device of a second application; receiving, by the central security gateway and from a second client device, a second request to access a second resource of the second application; transmitting, by the central security gateway, one or more second credentials associated with the second client device to a second authentication device; receiving, by the central security gateway, a second notification that the second client device is authenticated by the second authentication device; and instructing, by the central security gateway and via the second encrypted connection, the second application to provide the second client device with access to the second resource based upon the second notification that the second client device is authenticated by the second authentication device.

According to some embodiments, the second authentication device is the same as the authentication device.

According to some embodiments, establishing the first encrypted connection is performed via a host to host VPN, SSH tunneling and/or a service mesh.

Figure 8:
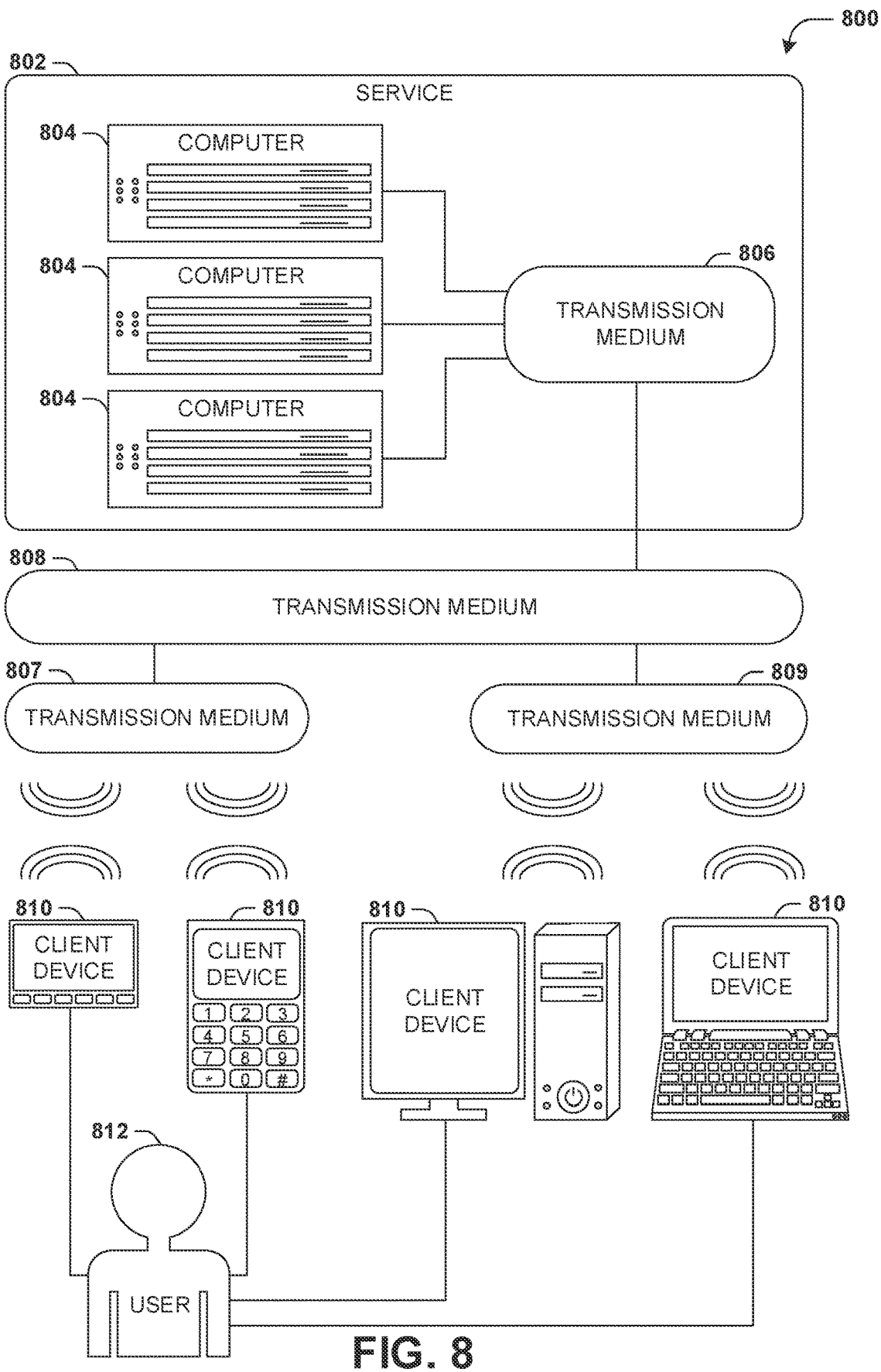
FIG. 8 is an illustration of a scenario involving various examples of transmission mediums that may be used to communicatively couple computers and clients.

FIG. 8 is an interaction diagram of a scenario 800 illustrating a service 802 provided by a set of computers 804 to a set of client devices 810 via various types of transmission mediums. The computers 804 and/or client devices 810 may be capable of transmitting, receiving, processing, and/or storing many types of signals, such as in memory as physical memory states.

The computers 804 of the service 802 may be communicatively coupled together, such as for exchange of communications using a transmission medium 806. The transmission medium 806 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 802.

Likewise, the transmission medium 806 may comprise one or more sub-networks, such as may employ different architectures, may be compliant or compatible with differing protocols and/or may interoperate within the transmission medium 806. Additionally, various types of transmission medium 806 may be interconnected (e.g., a router may provide a link between otherwise separate and independent transmission medium 806).

In scenario 800 of FIG. 8, the transmission medium 806 of the service 802 is connected to a transmission medium 808 that allows the service 802 to exchange data with other services 802 and/or client devices 810. The transmission medium 808 may encompass various combinations of devices with varying levels of distribution and exposure, such as a public wide-area network and/or a private network (e.g., a virtual private network (VPN) of a distributed enterprise).

In the scenario 800 of FIG. 8, the service 802 may be accessed via the transmission medium 808 by a user 812 of one or more client devices 810, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 810 may communicate with the service 802 via various communicative couplings to the transmission medium 808. As a first such example, one or more client devices 810 may comprise a cellular communicator and may communicate with the service 802 by connecting to the transmission medium 808 via a transmission medium 807 provided by a cellular provider. As a second such example, one or more client devices 810 may communicate with the service 802 by connecting to the transmission medium 808 via a transmission medium 809 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 804 and the client devices 810 may communicate over various types of transmission mediums.

Figure 9:
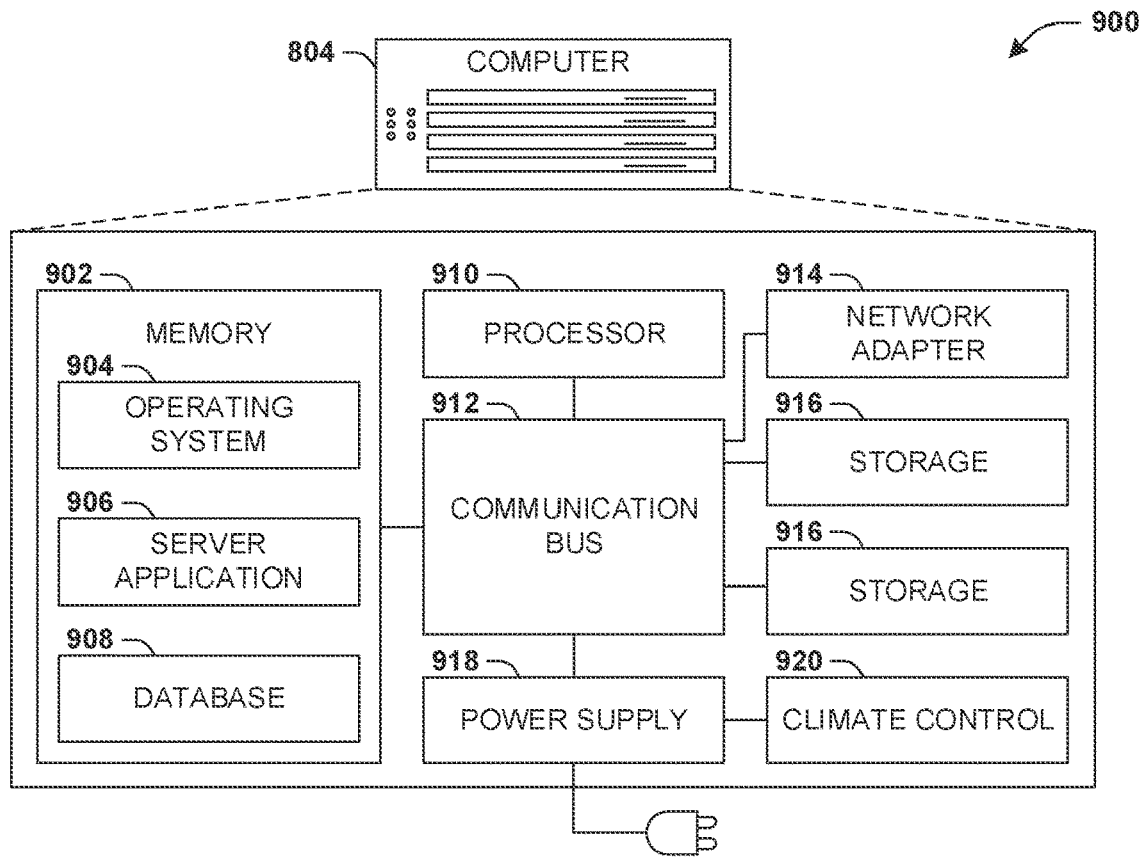
FIG. 9 is an illustration of a scenario involving an example configuration of a computer that may utilize and/or implement at least a portion of the techniques presented herein.

FIG. 9 presents a schematic architecture diagram 900 of a computer 804 that may utilize at least a portion of the techniques provided herein. Such a computer 804 may vary widely in configuration or capabilities, alone or in conjunction with other computers, in order to provide a service such as the service 802.

The computer 804 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The computer 804 may comprise memory 902 storing various forms of applications, such as an operating system 904; one or more computer applications 906; and/or various forms of data, such as a database 908 or a file system. The computer 804 may comprise a variety of peripheral components, such as a wired and/or wireless network adapter 914 connectible to a local area network and/or wide area network; one or more storage components 916, such as a hard disk drive, a solid-state storage device (SSD), a flash memory device, and/or a magnetic and/or optical disk reader.

The computer 804 may comprise a mainboard featuring one or more communication buses 912 that interconnect the processor 910, the memory 902, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 912 may interconnect the computer 804 with at least one other computer. Other components that may optionally be included with the computer 804 (though not shown in the schematic architecture diagram 900 of FIG. 9) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 918 that supplies and/or regulates power for the other components. The computer 804 may provide power to and/or receive power from another computer and/or other devices. The computer 804 may comprise a shared and/or dedicated climate control unit 920 that regulates climate properties, such as temperature, humidity, and/or airflow. Many such computers 804 may be configured and/or adapted to utilize at least a portion of the techniques presented herein.

Figure 10:
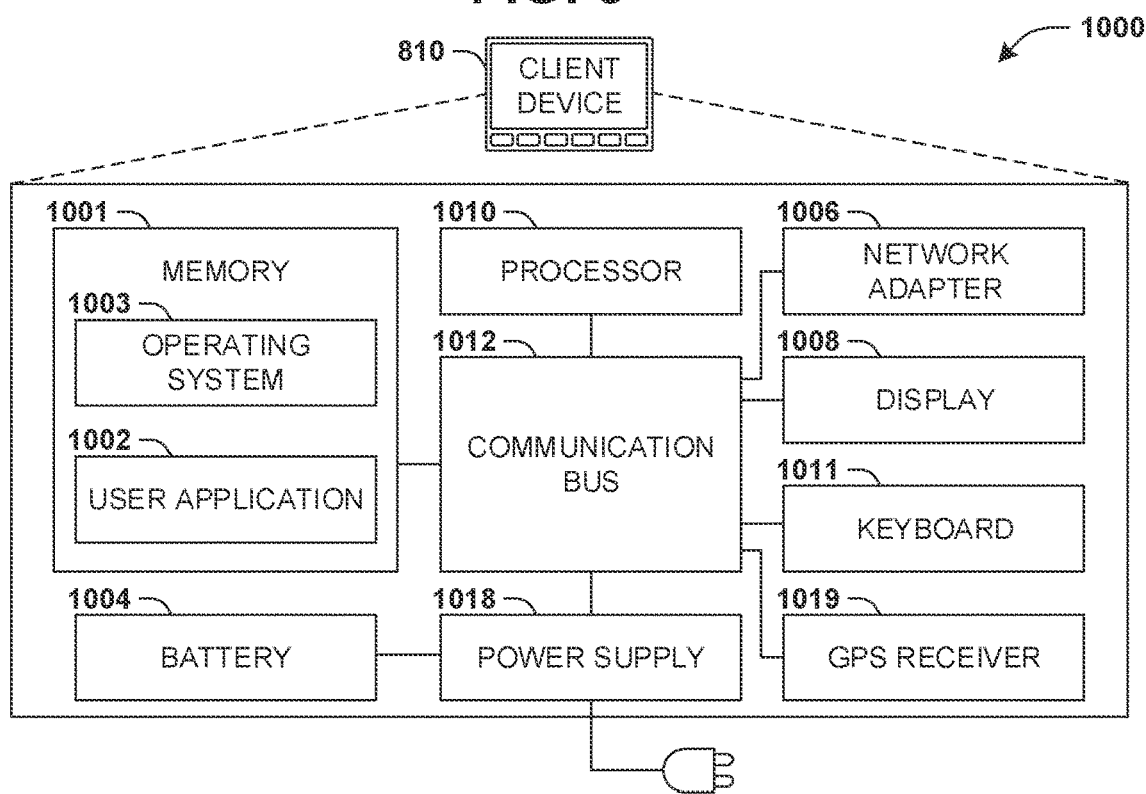
FIG. 10 is an illustration of a scenario involving an example configuration of a client that may utilize and/or implement at least a portion of the techniques presented herein.

FIG. 10 presents a schematic architecture diagram 1000 of a client device 810 whereupon at least a portion of the techniques presented herein may be implemented. Such a client device 810 may vary widely in configuration or capabilities, in order to provide a variety of functionality to a user such as the user 812. The client device 810 may be provided in a variety of form factors, such as a desktop or tower workstation; an "all-in-one" device integrated with a display 1008; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 810 may serve the user in a variety of roles, such as a workstation, kiosk, media player, gaming device, and/or appliance.

The client device 810 may comprise one or more processors 1010 that process instructions. The one or more processors 1010 may optionally include a plurality of cores; one or more coprocessors, such as a mathematics coprocessor or an integrated graphical processing unit (GPU); and/or one or more layers of local cache memory. The client device 810 may comprise memory 1001 storing various forms of applications, such as an operating system 1003; one or more user applications 1002, such as document applications, media applications, file and/or data access applications, communication applications such as web browsers and/or email clients, utilities, and/or games; and/or drivers for various peripherals. The client device 810 may comprise a variety of peripheral components, such as a wired and/or wireless network adapter 1006 connectible to a local area network and/or wide area network; one or more output components, such as a display 1008 coupled with a display adapter (optionally including a graphical processing unit (GPU)), a sound adapter coupled with a speaker, and/or a printer; input devices for receiving input from the user, such as a keyboard 1011, a mouse, a microphone, a camera, and/or a touch-sensitive component of the display 1008; and/or environmental sensors, such as a global positioning system (GPS) receiver 1019 that detects the location, velocity, and/or acceleration of the client device 810, a compass, accelerometer, and/or gyroscope that detects a physical orientation of the client device 810. Other components that may optionally be included with the client device 810 (though not shown in the schematic architecture diagram 1000 of FIG. 10) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 810 to a state of readiness; and a climate control unit that regulates climate properties, such as temperature, humidity, and airflow.

The client device 810 may comprise a mainboard featuring one or more communication buses 1012 that interconnect the processor 1010, the memory 1001, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 810 may comprise a dedicated and/or shared power supply 1018 that supplies and/or regulates power for other components, and/or a battery 1004 that stores power for use while the client device 810 is not connected to a power source via the power supply 1018. The client device 810 may provide power to and/or receive power from other client devices.

Figure 11:
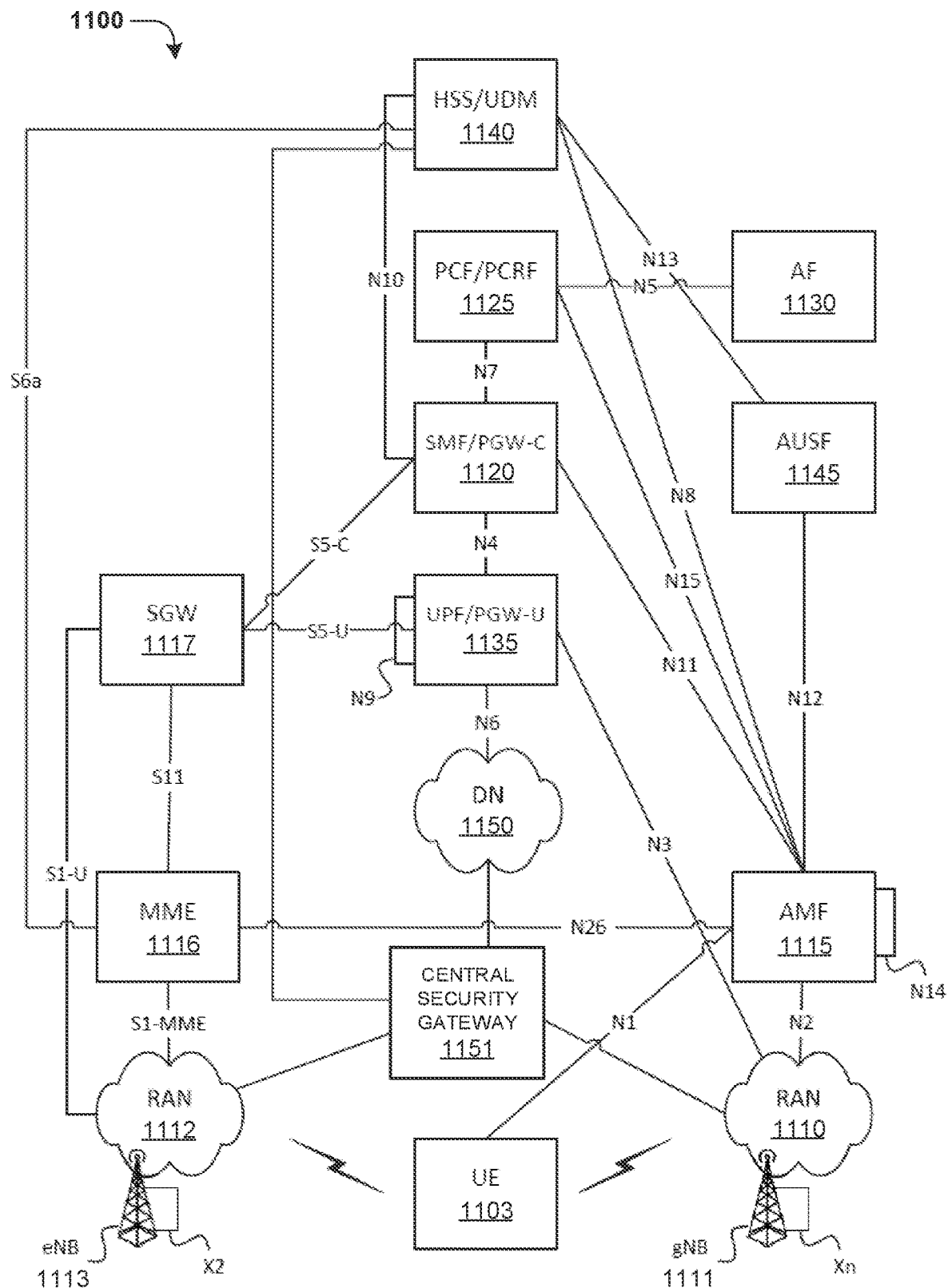
FIG. 11 is an illustration of an example environment in which at least a portion of the techniques presented herein may be utilized and/or implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 1103, RAN 1110 (which may include one or more Next Generation Node Bs ("gNBs") 1111), RAN 1112 (which may include one or more one or more evolved Node Bs ("eNBs") 1113), and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as central security gateway 1151.

The example shown in FIG. 11 illustrates one instance of each network component or function (e.g., one instance of SMF/PGW-C 1120, PCF/PCRF 1125, UPF/PGW-U 1135, HSS/UDM 1140, and/or 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or 1145, while another slice may include a second instance of SMF/PGW-C 1120, PCF/PCRF 1125, UPF/PGW-U 1135, HSS/UDM 1140, and/or 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively and/or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 1103 may include a computation and communication device, such as a wireless mobile communication device that is capable of communicating with RAN 1110, RAN 1112, and/or DN 1150. UE 1103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1103 may send traffic to and/or receive traffic (e.g., user plane traffic) from DN 1150 via RAN 1110, RAN 1112, and/or UPF/PGW-U 1135.

RAN 1110 may be, or may include, a 5G RAN that includes one or more base stations (e.g., one or more gNBs 1111), via which UE 1103 may communicate with one or more other elements of environment 1100. UE 1103 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 1103 via the air interface, and may communicate the traffic to UPF/PGW-U 1135, and/or one or more other devices or networks. Similarly, RAN 1110 may receive traffic intended for UE 1103 (e.g., from UPF/PGW-U 1135, AMF 1115, and/or one or more other devices or networks) and may communicate the traffic to UE 1103 via the air interface.

RAN 1112 may be, or may include, a LTE RAN that includes one or more base stations (e.g., one or more eNBs 1113), via which UE 1103 may communicate with one or more other elements of environment 1100. UE 1103 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 1103 via the air interface, and may communicate the traffic to UPF/PGW-U 1135, and/or one or more other devices or networks. Similarly, RAN 1110 may receive traffic intended for UE 1103 (e.g., from UPF/PGW-U 1135, SGW 1117, and/or one or more other devices or networks) and may communicate the traffic to UE 1103 via the air interface.

AMF 1115 may include one or more devices, systems, Virtualized Network Functions ("VNFs"), etc., that perform operations to register UE 1103 with the 5G network, to establish bearer channels associated with a session with UE 1103, to hand off UE 1103 from the 5G network to another network, to hand off UE 1103 from the other network to the 5G network, manage mobility of UE 1103 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, etc., that perform operations to register UE 1103 with the EPC, to establish bearer channels associated with a session with UE 1103, to hand off UE 1103 from the EPC to another network, to hand off UE 1103 from another network to the EPC, manage mobility of UE 1103 between RANs 1112 and/or eNBs 1113, and/or to perform other operations.

SGW 1117 may include one or more devices, systems, VNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, etc., that gather, process, store, and/or provide information in a manner described herein. SMF/PGW-C 1120 may, for example, facilitate in the establishment of communication sessions on behalf of UE 1103. In some embodiments, the establishment of communications sessions may be performed in accordance with one or more policies provided by PCF/PCRF 1125.

PCF/PCRF 1125 may include one or more devices, systems, VNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, etc., that receive, store, and/or provide information that may be used in determining parameters (e.g., quality of service parameters, charging parameters, or the like) for certain applications.

UPF/PGW-U 1135 may include one or more devices, systems, VNFs, etc., that receive, store, and/or provide data (e.g., user plane data). For example, UPF/PGW-U 1135 may receive user plane data (e.g., voice call traffic, data traffic, etc.), destined for UE 1103, from DN 1150, and may forward the user plane data toward UE 1103 (e.g., via RAN 1110, SMF/PGW-C 1120, and/or one or more other devices). In some embodiments, multiple UPFs 1135 may be deployed (e.g., in different geographical locations), and the delivery of content to UE 1103 may be coordinated via the N9 interface (e.g., as denoted in FIG. 11 by the line marked "N9" originating and terminating at UPF/PGW-U 1135). Similarly, UPF/PGW-U 1135 may receive traffic from UE 1103 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 1103.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 1103 may communicate, through DN 1150, with data servers, other UEs UE 1103, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 1103 may communicate.

The central security gateway 1151 may include one or more devices, systems, VNFs, etc., that perform one or more operations described herein. For example, the central security gateway 1151 may manage security and/or perform one or more services for applications.

Figure 12:
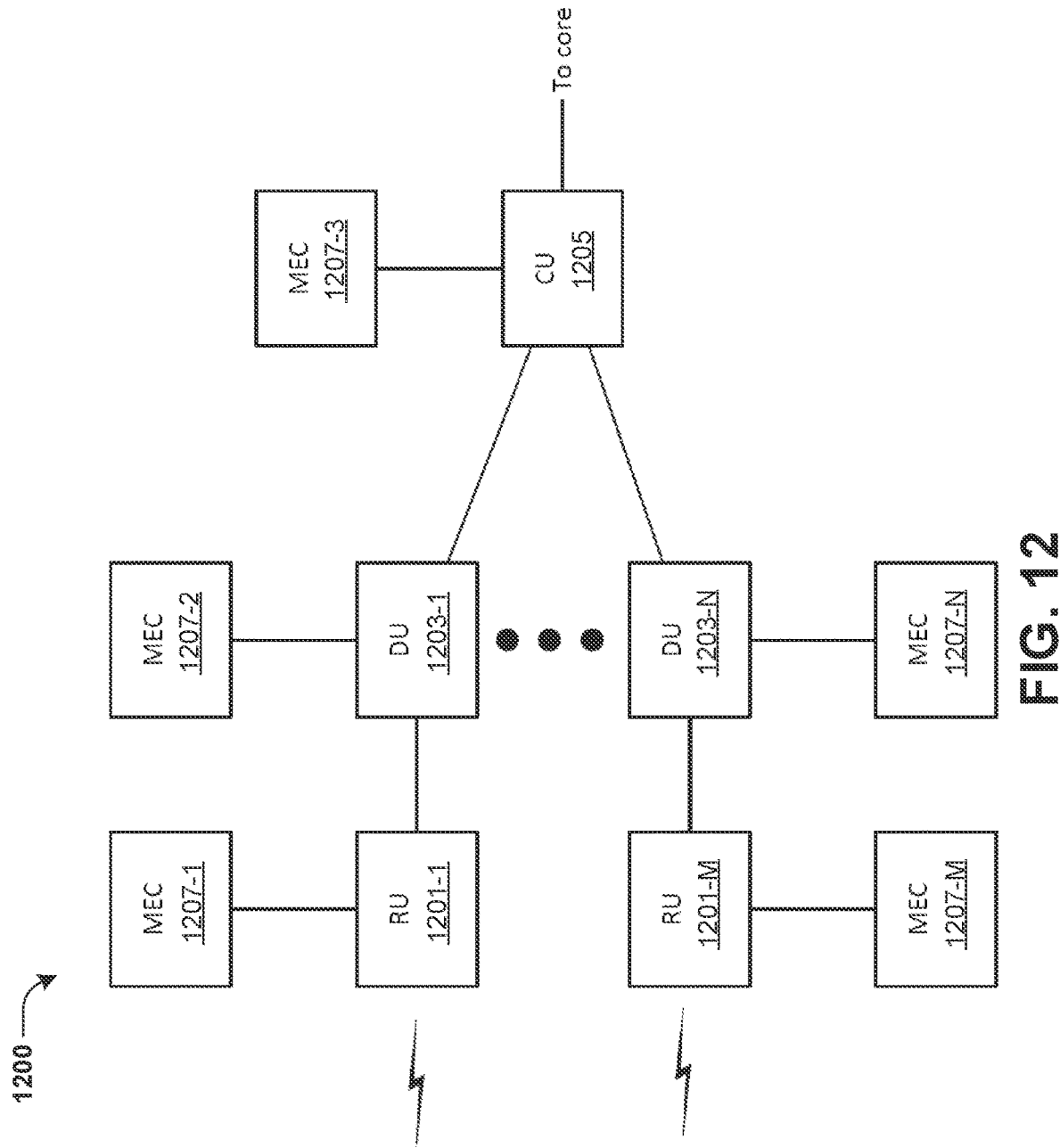
FIG. 12 is an illustration of an example network that may utilize and/or implement at least a portion of the techniques presented herein.

FIG. 12 illustrates an example Distributed Unit ("DU") network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Central Unit ("CU") 1205, one or more Distributed Units ("DUs") 1203-1 through 1203-N (referred to individually as "DU 1203," or collectively as "DUs 1203"), and one or more Radio Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs UE 1103 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 1103, and may determine which DU(s) 1203 should receive the downlink traffic. DU 1203 may include one or more devices that transmit traffic between a core network (e.g., via CU 1205) and UE 1103 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 1103.

RU 1201 may include hardware circuitry (e.g., one or more RF transceivers, antennas, radios, and/or other suitable hardware) to communicate wirelessly (e.g., via an RF interface) with one or more UEs UE 1103, one or more other DUs 1203 (e.g., via RUs 1201 associated with DUs 1203), and/or any other suitable type of device. In the uplink direction, RU 1201 may receive traffic from UE 1103 and/or another DU 1203 via the RF interface and may provide the traffic to DU 1203. In the downlink direction, RU 1201 may receive traffic from DU 1203, and may provide the traffic to UE 1103 and/or another DU 1203.

RUs 1201 may, in some embodiments, be communicatively coupled to one or more Multi-Access/Mobile Edge Computing ("MEC") devices, referred to sometimes herein simply as ("MECs") 1207. For example, RU 1201-1 may be communicatively coupled to MEC 1207-1, RU 1201-M may be communicatively coupled to MEC 1207-M, DU 1203-1 may be communicatively coupled to MEC 1207-2, DU 1203-N may be communicatively coupled to MEC 1207-N, CU 1205 may be communicatively coupled to MEC 1207-3, and so on. MECs 1207 may include hardware resources (e.g., configurable or provisionable hardware resources) that may be configured to provide services and/or otherwise process traffic to and/or from UE 1103, via a respective RU 1201.

For example, RU 1201-1 may route some traffic, from UE 1103, to MEC 1207-1 instead of to a core network (e.g., via DU 1203 and CU 1205). MEC 1207-1 may process the traffic, perform one or more computations based on the received traffic, and may provide traffic to UE 1103 via RU 1201-1. In this manner, ultra-low latency services may be provided to UE 1103, as traffic does not need to traverse DU 1203, CU 1205, and an intervening backhaul network between DU network 1200 and the core network. In some embodiments, MEC 1207 may include, and/or may implement some or all of the functionality described above with respect to the central security gateway 1151, the central security gateway 114, the first application and/or one or more application devices of the first set of application devices 126.

Figure 13:
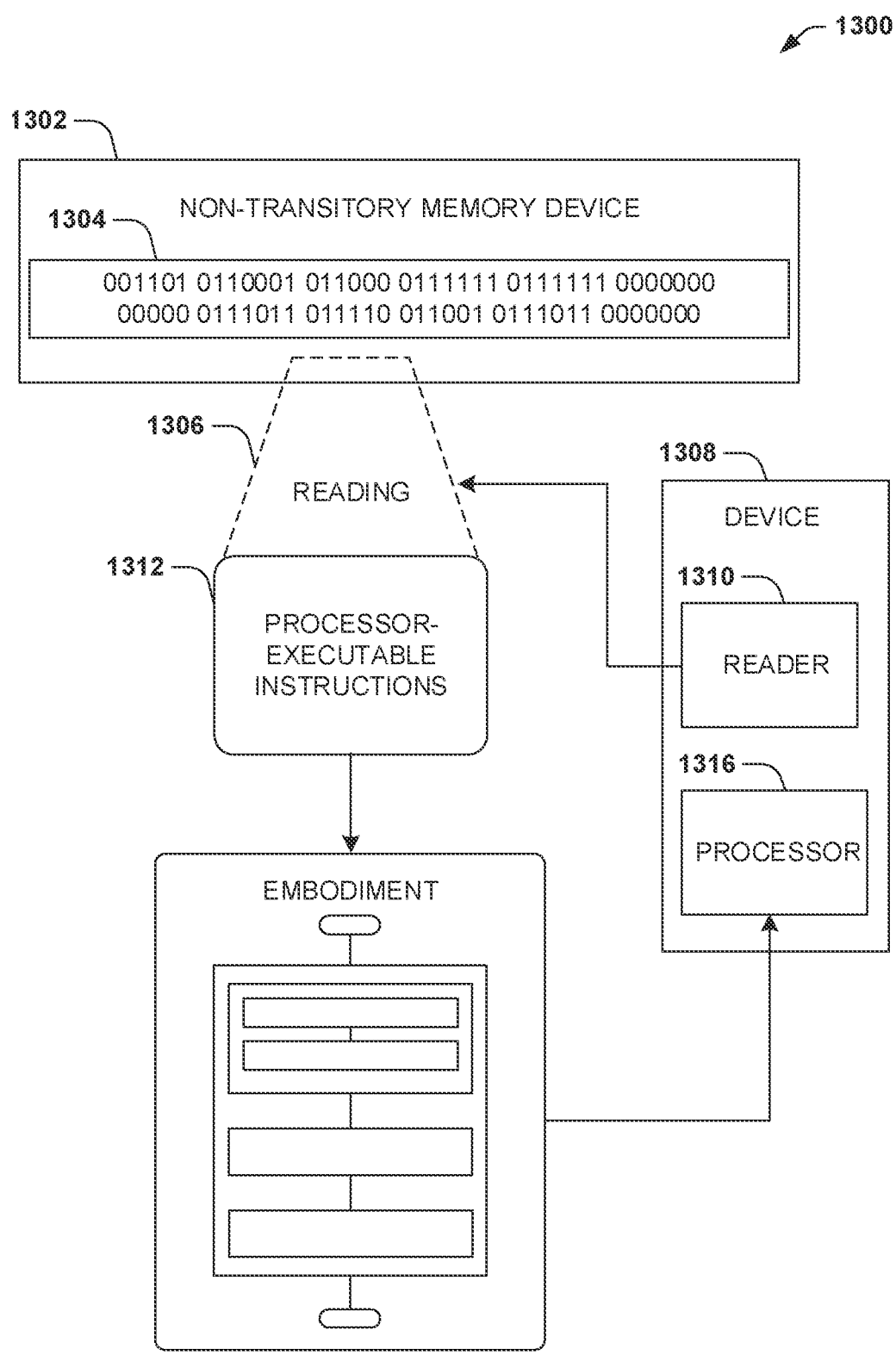
FIG. 13 is an illustration of a scenario featuring an example non-transitory machine readable medium in accordance with one or more of the provisions set forth herein.

FIG. 13 is an illustration of a scenario 1300 involving an example non-transitory machine readable medium 1302. The non-transitory machine readable medium 1302 may comprise processor-executable instructions 1312 that when executed by a processor 1316 cause performance (e.g., by the processor 1316) of at least some of the provisions herein. The non-transitory machine readable medium 1302 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1302 stores computer-readable data 1304 that, when subjected to reading 1306 by a reader 1310 of a device 1308 (e.g., a read head of a hard disk drive, or a read operation invoked on a solid-state storage device), express the processor-executable instructions 1312. In some embodiments, the processor-executable instructions 1312, when executed cause performance of operations, such as at least some of the example method 200 of FIG. 2, the example method 500 of FIG. 5, the example method 600 of FIG. 6 and/or the example method 700 of FIG. 7, for example. In some embodiments, the processor-executable instructions 1312 are configured to cause implementation of a system, such as at least some of the example system 101 of FIG. 1 and/or the example system 301 of FIG. 3, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   determining, by a central security gateway, first security policy information associated with a first application;
   establishing, by the central security gateway, a first encrypted connection with a first application server hosting the first application;
   managing, by the central security gateway and based upon the first security policy information, security associated with the first application, wherein managing security associated with the first application is performed by the central security gateway using the first encrypted connection established by the central security gateway with the first application server hosting the first application;
   determining, by the central security gateway, second security policy information associated with a second application;
   establishing, by the central security gateway, a second encrypted connection with a second application server hosting the second application; and managing, by the central security gateway and based upon the second security policy information, security associated with the second application, wherein managing security associated with the second application is performed by the central security gateway using the second encrypted connection established by the central security gateway with the second application server hosting the second application and comprises at least one of (i) authenticating, by the central security gateway, a second public key certificate based upon a public key certificate in a certificate store or (ii) instructing, by the central security gateway and via the second encrypted connection, the second application to provide a client device with access to a resource based upon a notification that the client device is authenticated by an authentication device.

2. The method of claim 1, wherein:
   managing security associated with the first application comprises:
   generating, by the central security gateway, a first public key certificate for the first application, wherein the first public key certificate is associated with verification of an identity of the first application; and
   transmitting, by the central security gateway and via the first encrypted connection, the first public key certificate to the first application server.

3. The method of claim 2, wherein:
   managing security associated with the first application comprises:
   storing, by the central security gateway, the first public key certificate for the first application in the certificate store;
   receiving, by the central security gateway and from a second client device, a certificate verification request indicative of a third public key certificate;
   authenticating, by the central security gateway, the third public key certificate based upon the first public key certificate, for the first application, in the certificate store; and
   transmitting, by the central security gateway and to the second client device, a second notification that the second public key certificate is authenticated.

4. The method of claim 1, wherein:
   managing security associated with the first application comprises:
   receiving, by the central security gateway, a first message, from a second client device, associated with initiating a connection between the second client device and the first application;

transmitting, by the central security gateway, a second message to the second client device, wherein:
the second message comprises a first public key certificate for the first application; and
the first public key certificate is associated with verification of an identity of the first application;
receiving, by the central security gateway and from the second client device, a third message; and
transmitting, by the central security gateway and via the first encrypted connection, a fourth message to the first application server, wherein the fourth message is based upon the third message.

5. The method of claim 1, wherein:
managing security associated with the first application comprises:
receiving, by the central security gateway and from a second client device, a first request to access a first resource of the first application;
transmitting, by the central security gateway, one or more first credentials associated with the second client device to the authentication device;
receiving, by the central security gateway and from the authentication device, a second notification that the second client device is authenticated by the authentication device; and
instructing, by the central security gateway and via the first encrypted connection, the first application to provide the second client device with access to the first resource based upon the second notification that the second client device is authenticated by the authentication device.

6. The method of claim 1, wherein:
managing security associated with the first application comprises at least two of:
managing, by the central security gateway and for the first application, at least one of Transport Layer Security (TSL) communication with a first client device or Secure Sockets Layer (SSL) communication with a second client device;
managing, by the central security gateway, at least one of issuance or renewal of a first public key certificate for the first application;
controlling, by the central security gateway, access of a third client device to one or more resources of the first application;
performing, by the central security gateway, a security audit of the first application; or
performing, by the central security gateway, security monitoring of the first application.

7. The method of claim 1, wherein:
establishing the first encrypted connection is performed via at least one of:
a host to host virtual private network (VPN);
secure shell (SSH) tunneling; or
a service mesh.

8. A method comprising:
determining, by a central security gateway, first security policy information associated with a first application;
establishing, by the central security gateway, a first encrypted connection with a first device of the first application;
storing, by the central security gateway, a public key certificate for the first application in a certificate store; and
managing, by the central security gateway and based upon the first security policy information, security associated with the first application, wherein managing security associated with the first application is performed using the first encrypted connection and comprises:
receiving, by the central security gateway and from a client device, a certificate verification request indicative of a second public key certificate;
authenticating, by the central security gateway, the second public key certificate based upon the public key certificate in the certificate store; and
transmitting, by the central security gateway and to the client device, a notification that the second public key certificate is authenticated.

9. The method of claim 8, comprising:
determining, by the central security gateway, second security policy information associated with a second application;
establishing, by the central security gateway, a second encrypted connection with a second device of the second application; and
managing, by the central security gateway and based upon the second security policy information, security associated with the second application, wherein managing security associated with the second application is performed using the second encrypted connection.

10. A method comprising:
determining, by a central security gateway, first security policy information associated with a first application;
establishing, by the central security gateway, a first encrypted connection with a first device of the first application; and
managing, by the central security gateway and based upon the first security policy information, security associated with the first application, wherein managing security associated with the first application is performed using the first encrypted connection and comprises:
receiving, by the central security gateway, a first message, from a client device, associated with initiating a connection between the client device and the first application;
transmitting, by the central security gateway, a second message to the client device, wherein:
the second message comprises a public key certificate for the first application; and
the public key certificate is associated with verification of an identity of the first application;
receiving, by the central security gateway and from the client device, a third message; and
transmitting, by the central security gateway and via the first encrypted connection, a fourth message to the first device, wherein the fourth message is based upon the third message.

11. The method of claim 10, comprising:
determining, by the central security gateway, second security policy information associated with a second application;
establishing, by the central security gateway, a second encrypted connection with a second device of the second application; and
managing, by the central security gateway and based upon the second security policy information, security associated with the second application, wherein managing security associated with the second application is performed using the second encrypted connection.

12. A method comprising:
determining, by a central security gateway, first security policy information associated with a first application;

establishing, by the central security gateway, a first encrypted connection with a first device of the first application; and managing, by the central security gateway and based upon the first security policy information, security associated with the first application, wherein managing security associated with the first application is performed using the first encrypted connection and comprises:

receiving, by the central security gateway and from a client device, a first request to access a first resource of the first application;

transmitting, by the central security gateway, one or more first credentials associated with the client device to an authentication device;

receiving, by the central security gateway and from the authentication device, a notification that the client device is authenticated by the authentication device; and instructing, by the central security gateway and via the first encrypted connection, the first application to provide the client device with access to the first resource based upon the notification that the client device is authenticated by the authentication device.

13. The method of claim 12, comprising:

determining, by the central security gateway, second security policy information associated with a second application;

establishing, by the central security gateway, a second encrypted connection with a second device of the second application; and managing, by the central security gateway and based upon the second security policy information, security associated with the second application, wherein managing security associated with the second application is performed using the second encrypted connection.

14. A method comprising:

determining, by a central security gateway, first security policy information associated with a first application;

establishing, by the central security gateway, a first encrypted connection with a first device of the first application; and managing, by the central security gateway and based upon the first security policy information, security associated with the first application, wherein managing security associated with the first application is performed using the first encrypted connection and comprises at least one of:

managing, by the central security gateway and for the first application, at least one of Transport Layer Security (TSL) communication with a first client device or Secure Sockets Layer (SSL) communication with a second client device;

managing, by the central security gateway, at least one of issuance or renewal of a public key certificate for the first application;

controlling, by the central security gateway, access of a third client device to one or more resources of the first application;

performing, by the central security gateway, a security audit of the first application; or performing, by the central security gateway, security monitoring of the first application.

15. The method of claim 14, comprising:

determining, by the central security gateway, second security policy information associated with a second application;

establishing, by the central security gateway, a second encrypted connection with a second device of the second application; and managing, by the central security gateway and based upon the second security policy information, security associated with the second application, wherein managing security associated with the second application is performed using the second encrypted connection.

16. The method of claim 14, wherein:

managing security associated with the first application comprises:

managing, by the central security gateway and for the first application, at least one of the TSL communication with the first client device or the SSL communication with the second client device.

17. The method of claim 14, wherein:

managing security associated with the first application comprises:

managing, by the central security gateway, at least one of the issuance or the renewal of the public key certificate for the first application.

18. The method of claim 14, wherein:

managing security associated with the first application comprises:

controlling, by the central security gateway, the access of the third client device to the one or more resources of the first application.

19. The method of claim 14, wherein:

managing security associated with the first application comprises:

performing, by the central security gateway, the security audit of the first application.

20. The method of claim 14, wherein:

managing security associated with the first application comprises:

performing, by the central security gateway, the security monitoring of the first application.

* * * * *